(12) United States Patent
Besley

(10) Patent No.: US 10,951,879 B2
(45) Date of Patent: Mar. 16, 2021

(54) METHOD, SYSTEM AND APPARATUS FOR CAPTURE OF IMAGE DATA FOR FREE VIEWPOINT VIDEO

(71) Applicant: CANON KABUSHIKI KAISHA, Tokyo (JP)

(72) Inventor: James Austin Besley, Killara (AU)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 15/831,193

(22) Filed: Dec. 4, 2017

(65) Prior Publication Data

US 2019/0174122 A1    Jun. 6, 2019

(51) Int. Cl.
| | |
|---|---|
| *H04N 13/282* | (2018.01) |
| *G06T 7/80* | (2017.01) |
| *G06T 15/20* | (2011.01) |
| *H04N 21/218* | (2011.01) |
| *H04N 13/139* | (2018.01) |
| *H04N 13/246* | (2018.01) |
| *H04N 21/44* | (2011.01) |

(52) U.S. Cl.
CPC ............. *H04N 13/282* (2018.05); *G06T 7/85* (2017.01); *G06T 15/20* (2013.01); *H04N 13/139* (2018.05); *H04N 13/246* (2018.05); *H04N 21/21805* (2013.01); *H04N 21/44008* (2013.01); *G06T 2207/10021* (2013.01)

(58) Field of Classification Search
CPC .. H04N 13/246; H04N 13/139; H04N 13/282; H04N 21/44008; H04N 21/21805; G06T 15/20; G06T 2207/10021; G06T 7/85
USPC .......................................................... 348/43
See application file for complete search history.

(56) References Cited

U.S. PATENT DOCUMENTS

| | | | |
|---|---|---|---|
| 6,018,349 A | * | 1/2000 | Szeliski ................ G06T 3/0068 345/629 |
| 7,525,576 B2 | | 4/2009 | Kannermark |

(Continued)

FOREIGN PATENT DOCUMENTS

CA    3025480 A1 *  11/2017   ........... G06T 15/205

OTHER PUBLICATIONS

Aljoscha Smolic "3D video and free viewpoint video—From capture to display", Pattern Recognition, vol. 44, Issue 9, Sep. 2011, pp. 1958-1968.

*Primary Examiner* — Loi H Tran
(74) *Attorney, Agent, or Firm* — Canon U.S.A., Inc., IP Division

(57) ABSTRACT

A method for synthesising a viewpoint, comprising: capturing a scene using a network of cameras, the cameras defining a system volume of the scene, wherein a sensor of one of the cameras has an output frame rate for the system volume below a predetermined frame rate; selecting a portion of the system volume as an operational volume based on the sensor output frame rate, the predetermined frame rate and a region of interest, the operational volume being a portion of the system volume from which image data for the viewpoint can be synthesised at the predetermined frame rate, wherein a frame rate for synthesising a viewpoint outside the operational volume is limited by the output frame rate; reading, from the sensors at the predetermined frame rate, image data corresponding to the operational volume; and synthesising the viewpoint at the predetermined frame rate using the image data.

13 Claims, 14 Drawing Sheets

(56) References Cited

U.S. PATENT DOCUMENTS

| | | | |
|---|---|---|---|
| 8,405,732 B2 | 3/2013 | Ahiska | |
| 8,681,859 B2 | 3/2014 | Washington | |
| 8,824,827 B2 | 9/2014 | Quan | |
| 9,237,286 B2 | 1/2016 | Theuwissen | |
| 9,398,214 B2 | 7/2016 | Ahiska | |
| 9,516,237 B1 | 12/2016 | Goyal | |
| 9,778,022 B1* | 10/2017 | Odle | G01B 11/002 |
| 10,096,122 B1* | 10/2018 | Agrawal | G06T 7/194 |
| 2004/0085451 A1* | 5/2004 | Chang | G06T 15/10 |
| | | | 348/159 |
| 2008/0181457 A1* | 7/2008 | Chattopadhyay | G06K 9/38 |
| | | | 382/103 |
| 2013/0321575 A1 | 12/2013 | Kirk | |
| 2014/0043227 A1* | 2/2014 | Skogo | G06F 1/325 |
| | | | 345/156 |
| 2015/0373250 A1* | 12/2015 | Sfaradi | H04N 5/23212 |
| | | | 348/345 |
| 2016/0140733 A1* | 5/2016 | Gu | H04N 5/247 |
| | | | 348/43 |
| 2016/0192009 A1* | 6/2016 | Sugio | G06K 9/3241 |
| | | | 725/32 |
| 2016/0284103 A1* | 9/2016 | Huang | G06T 7/0012 |
| 2017/0125064 A1* | 5/2017 | Aggarwal | G06K 9/00744 |
| 2017/0244991 A1* | 8/2017 | Aggarwal | H04L 67/10 |
| 2018/0192765 A1* | 7/2018 | Jeanne | A46B 15/0006 |
| 2019/0280770 A1* | 9/2019 | Hicks | H04B 10/116 |

* cited by examiner

METHOD, SYSTEM AND APPARATUS FOR CAPTURE OF IMAGE DATA FOR FREE VIEWPOINT VIDEO

FIELD OF INVENTION

The present disclosure relates to a method of capturing and processing of image data from a multi-camera network to generate free viewpoint video. In particular, the present disclosure relates to a method, system and apparatus for selectively reading pixels from the sensors of a multi-camera network in order to generate free viewpoint video of an event at a predetermined frame rate. The present disclosure also relates to a method and system for determining alignment data.

DESCRIPTION OF BACKGROUND ART

Computer vision systems have been used to generate free viewpoint video (FVV) of objects and activity in a field of view surrounded and imaged by a network of cameras. A free viewpoint video system may be capable of processing video images in real time and generating virtual video footage of the scene suitable for broadcast with a low latency. Alternatively, the processing may be off-line using post processing later viewing. Virtual video images may be generated from a variety of viewpoints and orientations that do not correspond to any of the cameras in the network.

Most free viewpoint video generation techniques work based on camera images captured by a calibrated camera network. A calibrated camera network is a network in which the cameras may be described in terms of a number of parameters. The calibration parameters consist of extrinsic parameters (e.g., orientation and pose) and intrinsic parameters (e.g., focal lengths, principal point offset and axis skew). The parameters may be determined from the analysis of a set of images from the camera network taken at approximately the same time.

There are many different known methods of free viewpoint video generation. One class of methods are model-based methods that reconstruct a full three-dimensional (3D) geometry of the scene, a second class are depth based methods that use depth estimation then generate free viewpoint video from image and depth data, and a third class are image-based methods that use some kind of interpolation of image data to form the free viewpoint video directly. The required density of sampling of an event by a camera network depends on the free viewpoint video generation method, the range of viewpoints that are to be generated, and the desired quality of output. Techniques used to generate a 3D geometry include structure from motion, shape-from-silhouette, visual hull reconstruction, shape from focus or defocus, structure from stereo and depth/disparity estimation algorithms.

The resolution of the virtual video images generated is limited by the resolution of the captured video from the camera network. If the captured event takes place in a large area then the cameras may be optically zoomed to a particular region of interest in order to allow higher resolution free viewpoint video to be generated. For example, in a soccer game the cameras may be zoomed to the penalty area around the goal at one end of the field, in baseball the cameras may be zoomed to one of the bases, or in cricket the cameras may target the area around the wicket. In other events, for example in the arts, the cameras may be directed towards star performers or a soloist. In order to cover multiple areas at high resolution for free viewpoint video it may be necessary to use multiple camera networks, each of which covers a particular region of interest, which may be costly.

Alternatively the cameras may be mounted on pant tilt zoom (PTZ) stages allowing them to be retargeted during an event. The speed of retargeting is limited by the mechanical properties of the PTZ stage. Also, the use of a mechanical stage can lead to instabilities that make it difficult to maintain the accuracy of calibration of the camera network, that may in turn lead to artefacts in the generation of free viewpoint video.

Calibration can be a time consuming process and is generally not performed for each frame of the video sequences separately. Calibration may be per-formed through the analysis of a set of images from each of the network cameras at approximately the same time. Even in the case of a fixed camera network, the accuracy of calibration may deteriorate over time due to physical instability of the system. For example there may be mechanical instability due to vibrations and drift of the physical elements and optical instability due to variation of optical properties (e.g. due to changing temperature).

Various techniques may be used to maintain the accuracy of the calibration data for the network over time so that the calibration data remains valid. Known techniques include mechanical stabilisation techniques, gyroscope based systems, and optical image stabilisation, all of which perform well at damping out high frequency instability such as camera shake but would not be expected to handle lower frequency motion such as drift. Another class of techniques may be referred to as digital image stabilisation methods which analyse the image pixels to determine a suitable correction either in the form of a transform to be applied to the current image frame to compensate for the motion of the camera or an update to the camera calibration parameters. The stabilisation methods can handle drift, however the performance of the methods is limited by the content of the images and they may perform poorly if there is limited texture in a scene. Also, depending on the implementation it may not be possible to achieve digital image stabilisation at the full frame rate of video capture.

SUMMARY OF THE INVENTION

It is an object of the present invention to substantially overcome, or at least ameliorate, one or more disadvantages of existing arrangements.

One aspect of the present disclosure provides a method for synthesising a viewpoint at a predetermined frame rate, the method comprising: capturing a scene using a network comprising a plurality of image capture devices, the plurality of image capture devices defining a system volume of the scene, wherein one of the sensors of at least one of the image capture devices has an output frame rate for the system volume below the predetermined frame rate; selecting a portion of the system volume as an operational volume based on the sensor output frame rate, the predetermined frame rate and a region of interest in the scene, the operational volume being a portion of the system volume from which image data for the viewpoint can be synthesised at the predetermined frame rate, wherein a frame rate for synthesising a viewpoint outside the operational volume is limited by the sensor output frame rate associated with at least one of the capture devices; reading, from the sensors and at the predetermined frame rate, image data corresponding to the operational volume; and synthesising the viewpoint at the predetermined frame rate using the image data, the viewpoint being synthesised by placing a virtual camera within the operational volume based on viewpoint parameters.

According to another aspect, the image data corresponding to the operational volume read from each sensor corresponds to a group of pixels having a geometry different to the geometry of the sensor.

According to another aspect, the group of pixels has a different aspect ratio to the sensor and the group of pixels has a different shape to the sensor.

According to another aspect, the method further comprises tracking the region of interest in the image data read from the sensors and updating the operational volume based on the tracking.

According to another aspect, the method further comprises determining the region of interest in the scene based on image data captured by the plurality of image capture devices.

According to another aspect, the region of interest is selected by an operator of the network of image capture devices.

According to another aspect, the method further comprises determining the region of interest in the scene based on image data captured by the plurality of image capture devices and mapping pixels of the sensor of each of the image capture devices to the region of interest.

According to another aspect, the method further comprises reading alignment data from the sensors, the alignment data relating to regions of the scene outside the region of interest.

According to another aspect, the method further comprises determining the alignment regions from image data captured for the scene by the plurality of image capture devices and performing patch-based alignment using the alignment data and calibrating the network of cameras based on the patch-based alignment.

According to another aspect, the method further comprises reading alignment data from the sensors, the alignment data relating to regions of the scene outside the region of interest determined in advance and performing patch-based alignment using the alignment data and calibrating the network of cameras based on the patch-based alignment.

According to another aspect, the method further comprises performing patch-based alignment using the alignment data and updating the pixels read out from the sensor based on the alignment.

According to another aspect, the method further comprises determining background pixels of the operational volume using a background model, and reading out the determined background pixels at a frame rate below the predetermined frame rate.

According to another aspect, the method further comprises reading out pixels forming a border a predetermined width around the operation volume, the pixels forming the border being read out at a frame rate below the predetermined frame rate.

Another aspect of the present disclosure provides a non-transitory computer-readable medium having a program stored thereon for synthesising a viewpoint at a predetermined frame rate, the program comprising: code for capturing a scene using a network comprising a plurality of image capture devices, the plurality of image capture devices defining a system volume of the scene, wherein one of the sensors of at least one of the image capture devices has an output frame rate for the system volume below the predetermined frame rate; code for selecting a portion of the system volume as an operational volume based on the sensor output frame rate, the predetermined frame rate and a region of interest in the scene, the operational volume being a portion of the system volume from which image data for the viewpoint can be synthesised at the predetermined frame rate, wherein a frame rate for synthesising a viewpoint outside the operational volume is limited by the sensor output frame rate associated with at least one of the capture devices; code for reading, from the sensors and at the predetermined frame rate, image data corresponding to the operational volume; and code for synthesising the viewpoint at the predetermined frame rate using the image data, the viewpoint being synthesised by placing a virtual camera within the operational volume based on viewpoint parameters.

Another aspect of the present disclosure provides apparatus configured to: capture a scene using a network comprising a plurality of image capture devices, the plurality of image capture devices defining a system volume of the scene, wherein one of the sensors of at least one of the image capture devices has an output frame rate for the system volume below the predetermined frame rate; select a portion of the system volume as an operational volume based on the sensor output frame rate, the predetermined frame rate and a region of interest in the scene, the operational volume being a portion of the system volume from which image data for the viewpoint can be synthesised at the predetermined frame rate, wherein a frame rate for synthesising a viewpoint outside the operational volume is limited by the sensor output frame rate associated with at least one of the capture devices; read, from the sensors and at the predetermined frame rate, image data corresponding to the operational volume; and synthesise the viewpoint at the predetermined frame rate using the image data, the viewpoint being synthesised by placing a virtual camera within the operational volume based on viewpoint parameters.

Another aspect of the present disclosure provides a system, comprising: a network comprising a plurality of image capture devices, the plurality of image capture devices defining a system volume of a scene, wherein one of the sensors of at least one of the image capture devices has an output frame rate for the system volume below a predetermined frame rate; a memory for storing data and a computer readable medium; a processor coupled to the memory for executing a computer program, the program having instructions for: capturing the scene using the network comprising the plurality of image capture devices; selecting a portion of the system volume as an operational volume based on the sensor output frame rate, the predetermined frame rate and a region of interest in the scene, the operational volume being a portion of the system volume from which image data for the viewpoint can be synthesised at the predetermined frame rate, wherein a frame rate for synthesising a viewpoint outside the operational volume is limited by the sensor output frame rate associated with at least one of the capture devices; reading, from the sensors and at the predetermined frame rate, image data corresponding to the operational volume; and synthesising the viewpoint at the predetermined frame rate using the image data, the viewpoint being synthesised by placing a virtual camera within the operational volume based on viewpoint parameters According to another aspect, the program further comprises instructions for tracking the region of interest in the image data read from the sensors and updating the operational volume based on the tracking.

According to another aspect, the program further comprises instructions for reading alignment data from the sensor, the alignment data relating to regions of the scene outside the region of interest.

According to another aspect, the program further comprises instructions for calibrating the network using the alignment data and updating the pixels read out from the sensor based on the calibration.

According to another aspect, the program further comprises instructions for determining background pixels of the operational volume using a background model derived based on pixels outside the region of interest.

Other aspects of the invention are also disclosed.

BRIEF DESCRIPTION OF THE DRAWINGS

One or more embodiments of the invention will now be described with reference to the following drawings, in which.

DETAILED DESCRIPTION

Figure 1:
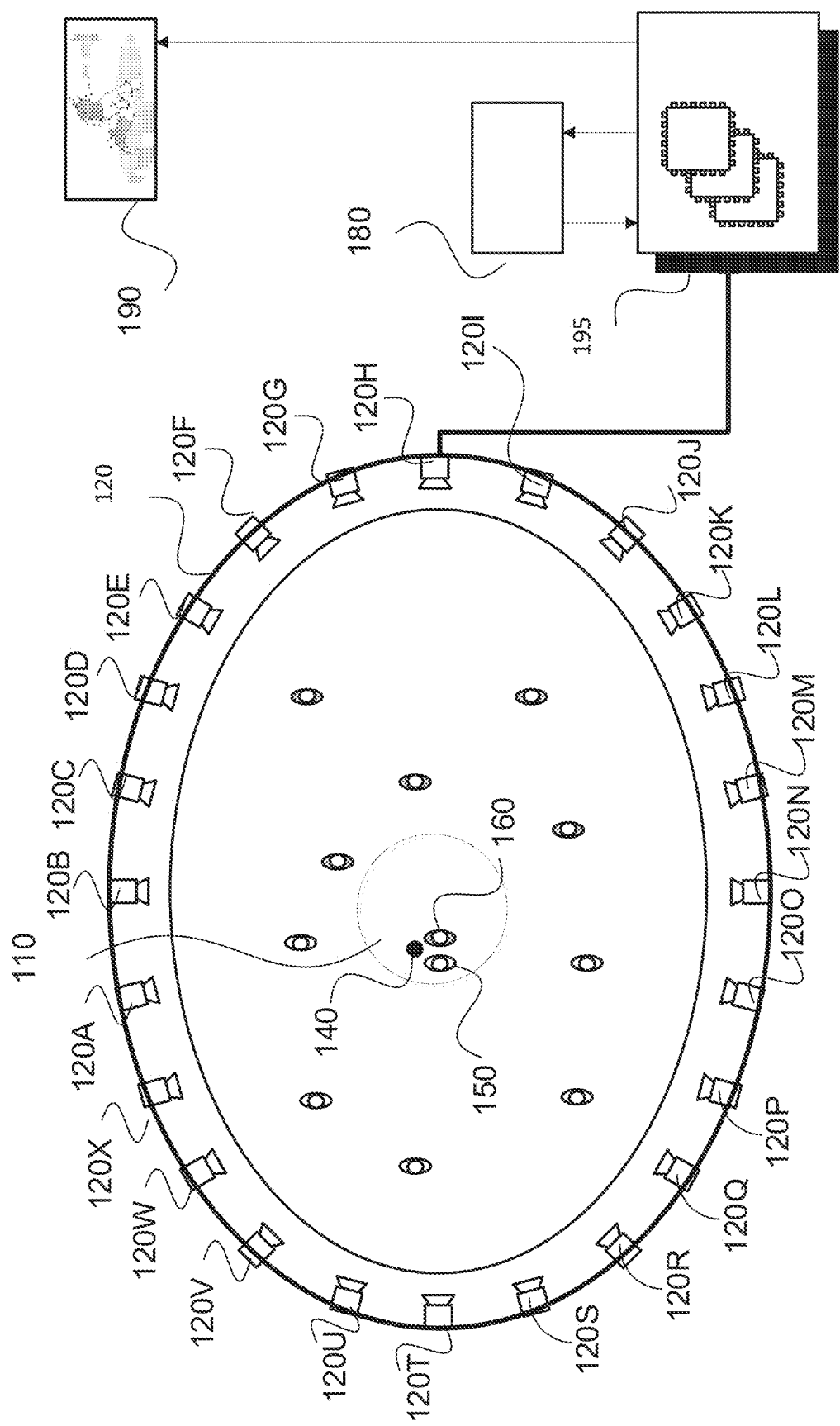
FIG. 1 shows a network of cameras surrounding a region of interest (ROI) or a volume of interest (VOI)

Where reference is made in any one or more of the accompanying drawings to steps and/or features, which have the same reference numerals, those steps and/or features have for the purposes of this description the same function (s) or operation(s), unless the contrary intention appears.

Arrangements described herein may be used with a network of cameras 120A-120X, as shown in FIG. 1, set up around a region of interest (ROI) 110, also referred to as a volume of interest, for live capture and broadcast. The network of cameras 120A-120X is configured as a ring or network of cameras 120 in the example of FIG. 1. Each of the cameras 120A to 120X is an image capture device suitable for capturing video data, and which has an image capture sensor from which a portion of the pixels can be selected and read at a time.

FIG. 1 shows an area 100 viewed from above. In the example of FIG. 1, the marked region of interest (ROI) 110 is an area on a ground surface where objects or players may be located such that the objects or players are captured by the camera network 120 and able to be included in synthesised images from virtual viewpoints. In reality, the objects and players are located in a volume above the ground that may be referred to as a volume of interest (VOI). In order to image typical activities such as sport, theatre, dance, music, opera or other performances, the volume of interest will typically extend two or more metres above the ground. The volume of interest may correspond to a fixed region of interest, or may correspond to a moving region of interest. For example the VOI may correspond to a person such as a sports player, an object such as sporting equipment (e.g. a ball) that may be tracked over time.

As described below, the cameras 120A-120X may be part of a computer vision system used to generate free viewpoint video (FVV). The free viewpoint video system may be used to process video in real time and generate virtual video footage of a scene suitable for broadcast with a low latency. In order to generate free viewpoint video, video data must be received at a required broadcast frame rate. The predetermined frame rate is typically predetermined and a relatively high frame rate.

The cameras 120A-120X of FIG. 1 surround the region of interest 110 in a single ring of cameras. However, in another arrangement, cameras may surround the region of interest 110 in a plurality of rings at different heights.

As shown in FIG. 1, the cameras 120A-120X are evenly spread around the region of interest 110. In another arrangement, there may be a larger density of cameras at particular locations, or the locations of the cameras may be randomly spread. The locations of the cameras may be limited, for example, due to the physical surroundings of the region of interest 110.

In the arrangement of FIG. 1, the cameras 120A-120X are mounted and fixed. However, in alternative arrangements, the cameras 120A-120X may be capable of pan, tilt and zoom (PTZ) and may be hand held and mobile. In order to produce free viewpoint video, stabilised frames may be required from captured video. Alternatively, accurate calibration data associated with each frame may be required. The calibration data may include the effect of any temporal variation in image capture due to the cameras 120A-120X either being controlled (e.g. by an operator or some kind of automated control system) or due to mechanical or optical instability in the cameras 120A-120X. The instability may include vibrations, hand shake, or slow drifts such as are due to environmental changes (e.g., temperature, air pressure, wind, crowd motion, etc). In some configurations the sensor read out may be customised through an extended digital PTZ to achieve efficient image capture for free viewpoint video and for frame stabilisation.

In one arrangement, the area 100 may be a sports venue, arena or stadium with a large number of cameras (e.g., tens or hundreds of cameras) with fixed pan, tilt, zoom (PTZ) directed in towards a playing area (such as the region 110), A typical playing area is approximately rectangular, circular or oval, allowing the playing area to be surrounded by one or more rings of cameras so that all points on the playing area are captured simultaneously from a large number of viewpoints. In some arrangements, a full ring of cameras is not employed but rather some subsets of the cameras 120A-120X are used. Arrangements where subsets of the cameras 120A-120X are used may be advantageous when certain viewpoints are known to be unnecessary ahead of time.

In one arrangement, the cameras 120A-120X may be synchronised to acquire frames at the same instants in time.

In one arrangement, the cameras 120A-120X may be roughly set up at different heights (e.g., in three (3) rings at different heights) and may focus on specific pre-selected areas of a playing field within the region of interest 110. The image features used for stabilisation may be line like field markings.

Alternatively, the region of interest 110 may be a stage at a performance venue. For a stage, a set of cameras 120 (e.g., tens of cameras) may be directed in towards the stage from various directions in front of the performance. In a stage arrangement, challenges may include changing scenery or equipment on the stage. The features for image processing used in such a stage arrangement may be more varied than for a sports venue.

The cameras 120A-120X may be traditional live broadcast types of cameras, digital video cameras, surveillance cameras, or other devices with imaging capability such as a mobile phone, tablet, computer with web-cam, etc. In the described arrangements, the cameras 120A-120X capture high definition (HD) video frames. However, all of the described methods may be adapted to other frame formats such as standard definition (SD), 4K or 8K.

In the example of FIG. 1, the region of interest 110 is in an arena having an oval playing field surrounded by the ring of cameras 120. The region of interest 110, in the example of FIG. 1, contains players from a first team (e.g. 150) and a second team (e.g. 160) and a ball 140. In the example of FIG. 1, the player 150 may be represented by a first object, the player 160 may be represented by a second object and the ball 140 by a third object.

Figure 2A:
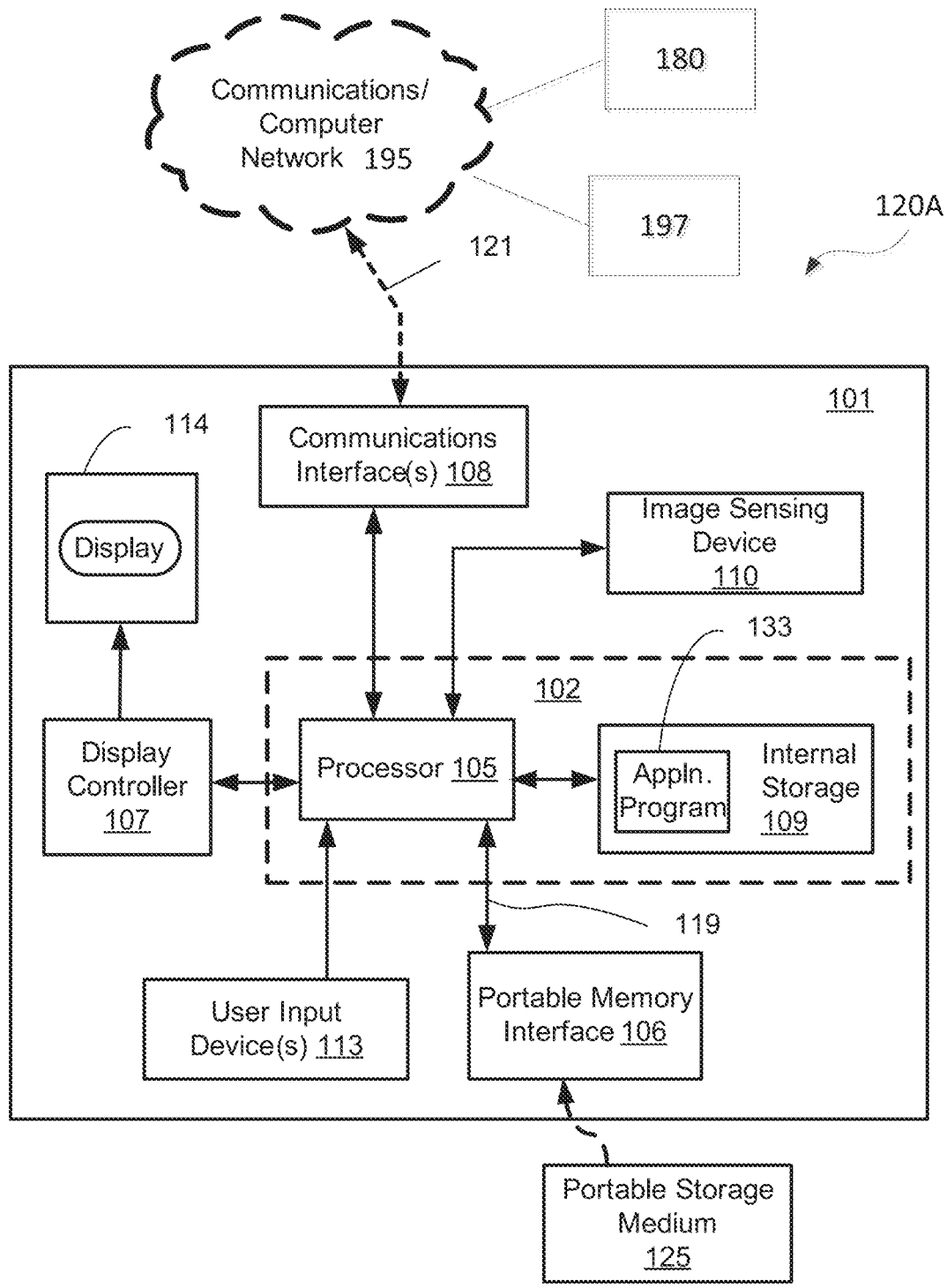
FIGS. 2A and 2B collectively form a schematic block diagram representation of a camera system upon which described arrangements can be practiced.

Video frames captured by a camera, such as the camera 120A, are subject to processing and temporary storage near the camera 120A prior to being made available to a processing unit 105 (see FIGS. 2A and 2B) configured for performing video processing. As shown in FIG. 2A, the processing unit 105 is configured within a module of a camera. However, in an alternative arrangement, a separate video processing unit may be used to implement the described arrangements.

The processing unit 105 receives controlling input from a controller 180 that specifies settings of the cameras 120A to 120X. The processing unit 105 may be configured to synthesise a specified camera point of view (or viewpoint) 190 based on video streams available to the processing unit 105 from the cameras 120A-120X surrounding the arena 110.

The controlling input to the controller 180 may be generated by a human virtual camera operator and be based on input from a user interface device such as a joystick, mouse or similar controller including dedicated controllers comprising multiple input components. Alternatively, the camera position and parameters may be generated fully automatically based on analysis of game play. Hybrid control configurations are also possible whereby some aspects of the camera positioning are directed by a human operator and others by an automated algorithm. For example, coarse positioning may be performed by a human operator and fine positioning, including stabilisation and path smoothing may be performed by an automated algorithm.

The processing unit 105 may be configured to achieve frame synthesis using any suitable methods of free viewpoint video generation. Methods of free viewpoint video generation include model-based methods that reconstruct a full 3D geometry of the scene, depth based methods that use depth estimation then generate free viewpoint video from image and depth data, and image-based methods that use some kind of interpolation of image data to form the free viewpoint video directly. The processing unit 105 may also be configured to provide feedback in the form of the frame quality or the completeness of camera coverage for the requested viewpoint so that a device generating the camera position control signal can be aware of the practical bounds of the processing unit 105. Video streams 190 created by the processing unit 105 may subsequently be provided to a production desk (not depicted) where the video streams 190 may be edited together to form a broadcast video. Alternatively, the video streams may be broadcast unedited or stored for later compilation.

In one arrangement, image stabilisation is performed on a dedicated processing unit connected directly to a camera, such as the processing unit 105 of the camera 120A. However, in other arrangements, analysis may be performed on a server or other non-local processing unit. The advantage of analysis at or near to the camera 120A is the potential for reduced latency. Detected changes in camera calibration parameters may be used in processing of a video sequence comprising a plurality of images, for example, to transform the video sequence frames to match a reference frame or to update camera calibration parameters used in a computer vision system.

The camera digital pan tilt zoom sensor read out control methods for efficient image capture for free viewpoint video and/or calibration parameter change detection to be described below herein will be described by way of example with reference to the camera 120A. However, the described methods may be implemented using any of the cameras 120A-120X.

Figure 2B:
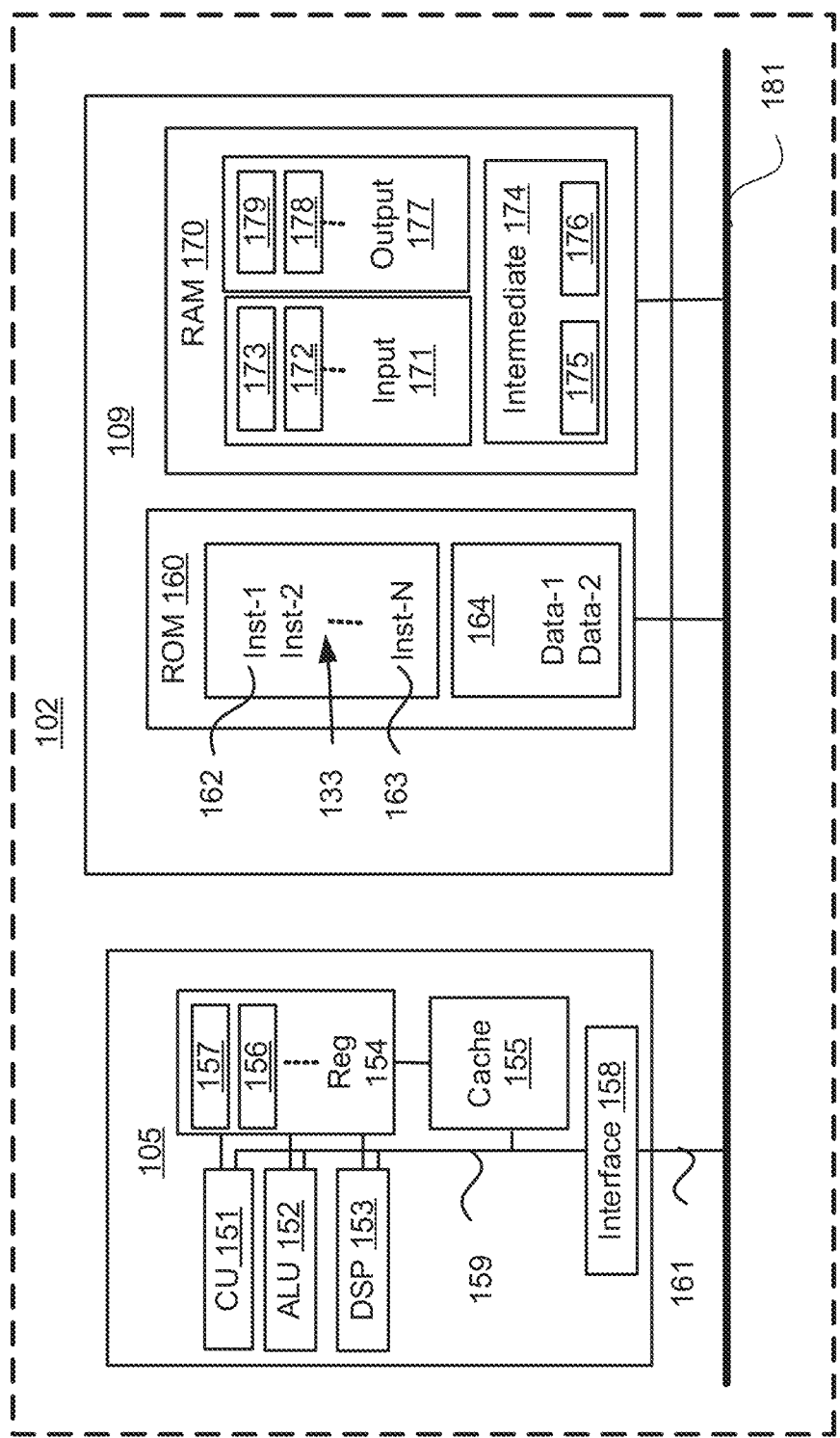

FIGS. 2A and 2B collectively form a schematic block diagram of the camera 120A including embedded components, upon which the digital PTZ sensor read out control methods to be described are desirably practiced. In other arrangements, some steps of methods described (for example in relation to calibration and patch alignment) may be performed by a camera such as the camera 120A, and other steps (such as synthesizing or generating viewpoint video) may be implemented on an external device such as a computer module or server in communication with the cameras 120A to 120X. A suitable external device would typically operate in a similar manner to the camera 120A as described in relation to FIGS. 2A and 2B.

The camera 120A may be, for example, a digital camera or a mobile phone, in which processing resources are limited. Nevertheless, the methods to be described may also be performed on higher-level devices such as desktop computers, server computers, and other such devices with significantly larger processing resources.

The camera 120A is used to capture input images representing visual content of a scene appearing in the field of view (FOV) of the camera 120A. Each image captured by the camera 120A comprises a plurality of visual elements. A visual element is defined as an image sample. In one arrangement, the visual element is a pixel, such as a Red-Green-Blue (RGB) pixel. In another arrangement, each visual element comprises a group of pixels. In yet another arrangement, the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is YUV, where the Y component represents luminance, and the U and V components represent chrominance.

A typical digital imaging device uses optics to focus light from a scene onto an image sensor such as a CMOS or CCD sensor. The sensor is made up of an array of pixels that capture light falling and generate a signal according to the light intensity. Colour images may be formed through the use of colour filters that selectively pass frequency bands from the spectrum of light. Most sensors are configured to form a rectangular image from the full set of pixels based on the generated signals from the pixels. The frame rate, that is the rate at which the pixels may be sampled from the sensor to form an image, can depend on many factors. The factors affecting achievable frame rate include the necessary exposure of the pixels, the light levels, and the bandwidth of the sensor.

Figure 3:
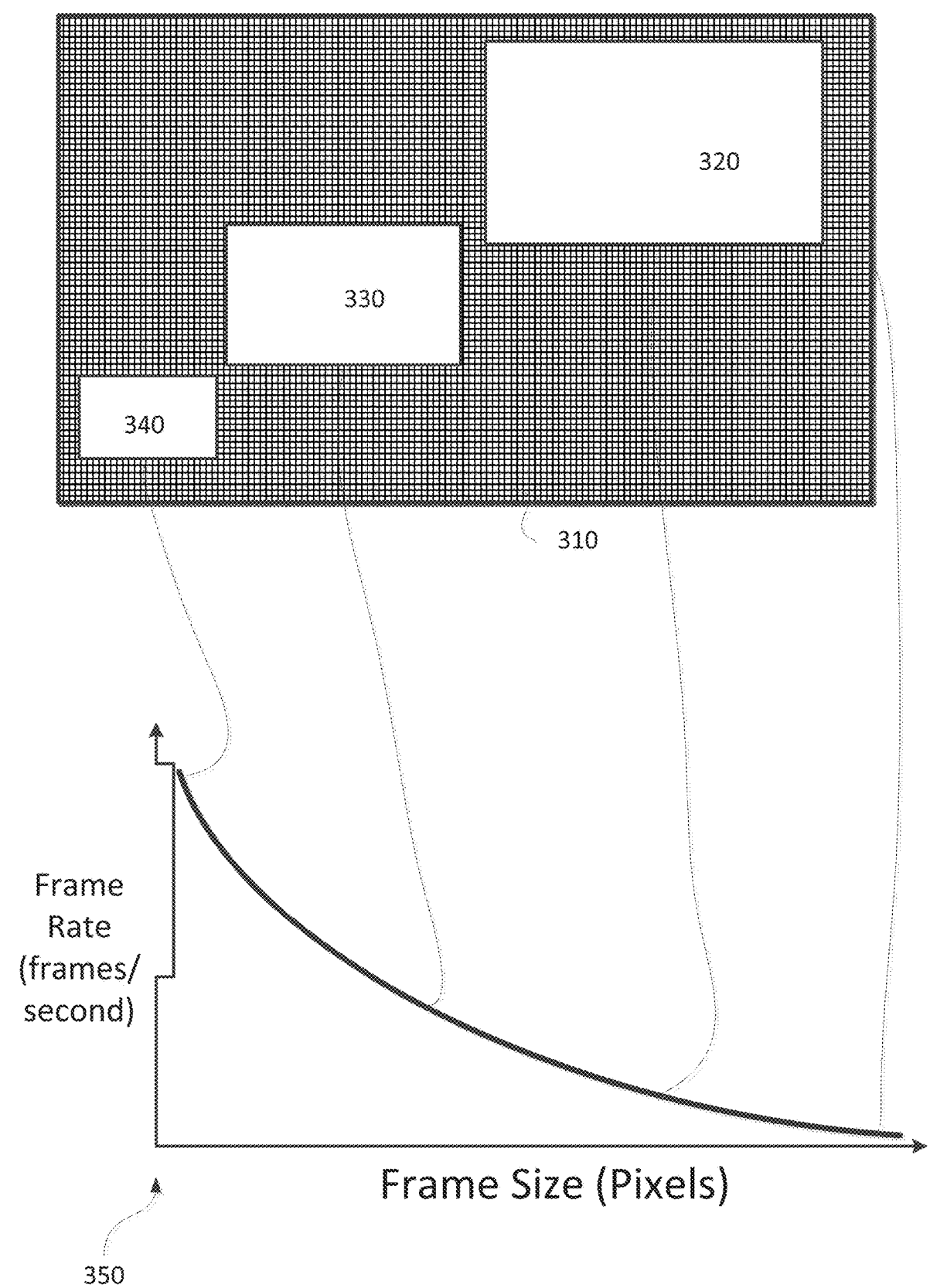
FIG. 3 illustrates the variation of achievable frame rate as a function of frame size in pixels for a configurable sensor.

The bandwidth of the sensor may thought of as a maximum data rate with which pixel signal reading may be transmitted from the sensor. If the frame rate is limited by such a bandwidth, then a higher frame rate may be possible if only a reduced set of pixels are sampled and transmitted in each frame. For example, the (predetermined) broadcast frame rate required for free viewpoint video generation may be higher than the frame rate achievable due to the bandwidth of the sensor. An example relationship between achievable frame rate and number of pixels sampled is illustrated in FIG. 3 which shows a full sensor of pixels, 310, and a set of decreasing frame sizes 320, 330, and 340. A corresponding plot 350 in FIG. 3 shows the variation of achievable frame rate as a function of frame size in pixels. Some sensor technologies allow a trade-off of size and frame rate to be used in practice, that is the frame is configurable and the frame rate depends on the selected frame. Some arrangements described in this disclosure assume the use of such sensors.

As seen in FIG. 2A, the camera 120A comprises an embedded controller 102. In the present example, the controller 102 comprises the processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 2B. The RAM 170 may be volatile, non-volatile or a combination of volatile and non-volatile memory.

The camera 120A may include a display controller 107, which is connected to a display 114, such as a liquid crystal display (LCD) panel or the like. The display controller 107 is configured for displaying graphical images on the display 114 in accordance with instructions received from the controller 102, to which the display controller 107 is connected.

The camera 120A also includes user input devices 113 which are typically formed by a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus. Inputs to the module 101 may also be received from the controller 180.

As seen in FIG. 2A, the camera 120A also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera 120A also has a communications interface 108 to permit coupling of the camera 120A to a computer or communications network 195 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), infrared Data Association (IrDa) and the like. The controller 180 may be connected to camera 120A via the network 195. If the methods described are implemented by an external device (such as a server 197), the external device may communicate with the camera network 120 by the network 195.

Typically, the controller 102, in conjunction with an image sensing device 110, is provided to perform the functions of the camera 120A. The image sensing device 110 may include a lens, a focus control unit and an image sensor. In one arrangement, the sensor is a photo-sensitive sensor array. As another example, the camera 120A may be a mobile telephone handset. In this instance, the image sensing device 110 may also represent those components required for communications in a cellular telephone environment. The image sensing device 110 may also represent a number of encoders and decoders of a type including Joint Photographic Experts Group (JPEG), (Moving Picture Experts Group) MPEG, MPEG-1 Audio Layer 3 (MP3), and the like. The image sensing device 110 captures an input image and provides the captured image as an input image.

Figure 10:
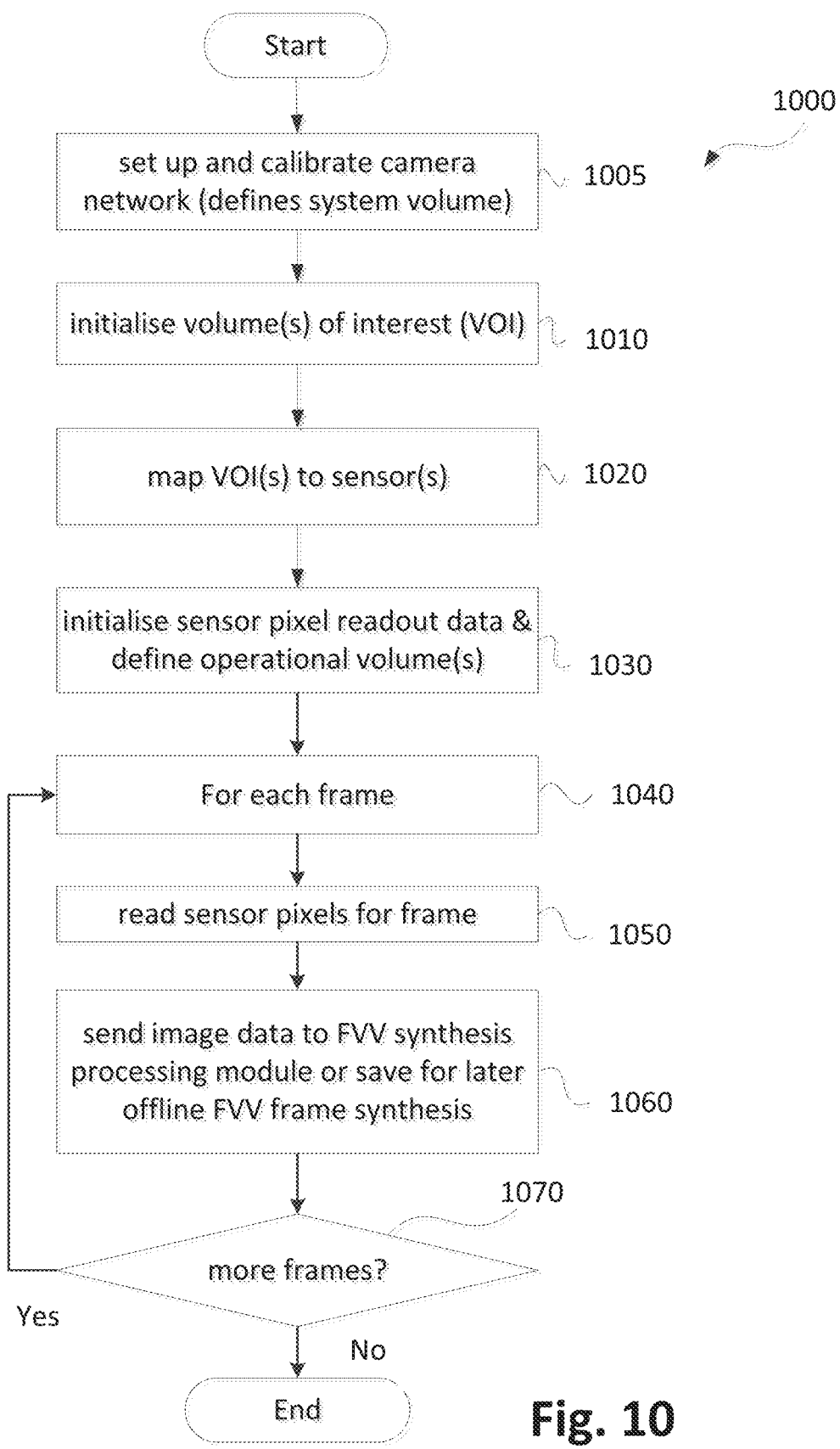
FIG. 10 shows a schematic flow diagram showing a method of reading image data from camera sensors for the generation of free viewpoint video for a calibrated network of cameras for one or more fixed volumes of interest.
Figure 11:
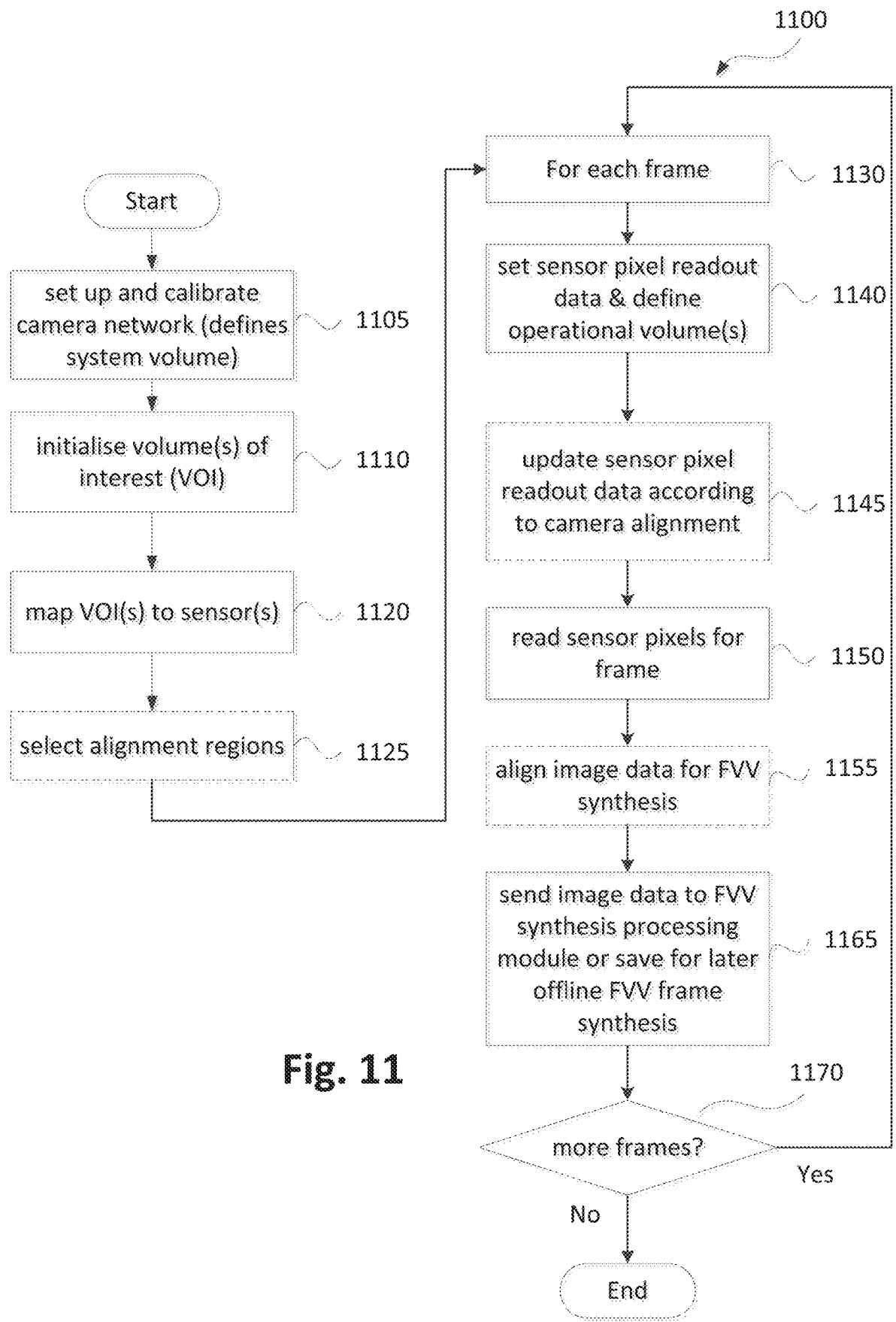
FIG. 11 shows a schematic flow diagram showing a method of reading image data from camera sensors for the generation of free viewpoint video for a calibrated network of cameras for one or more volumes of interest that may be moving, where the captured image data may be aligned using digital image stabilisation.

The described methods below may be implemented using the embedded controller 102, where the processes of FIGS. 10 and 11 may be implemented as one or more software application programs 133 executable within the embedded controller 102. The camera 120A of FIG. 2A implements the described methods. In particular, with reference to FIG. 2B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application program 133 may be supplied to the user encoded on one or more CD-ROM (not shown) and read via the portable memory interface 106 of FIG. 2A prior to storage in the internal storage module 109 or in the portable memory 125. In another alternative, the software application program 133 may be read by the processor 105 from the network 195, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 2A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the electronic device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 2A, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101.

There are many different known methods of free viewpoint video generation, also referred to as free viewpoint video synthesis. One class of methods are model-based methods that reconstruct a full 3D geometry of the captured scene, a second class are depth based methods that use depth estimation then generate free viewpoint video from image and depth data, and a third class are image-based methods that use some kind of interpolation of image data to form the free viewpoint video directly. The required density of sampling of an event by a camera network depends on the free viewpoint video generation method, the range of viewpoints that are to be generated, and the desired quality of output. An example of a method of generating or synthesizing free viewpoint video is provided by Smolic "3D video and free viewpoint video—From capture to display", Pattern Recognition, 2011, Volume 44, Issue 9, September 2011, Pages 1958-1968.

Techniques used to generate a 3D geometry include structure from motion, shape-from-silhouette, visual hull reconstruction, shape from focus or defocus, structure from stereo and depth/disparity estimation algorithms.

Free viewpoint video may be generated for a passive (constant) scene such as a building or a fixed object using a single camera that is moved in space and captures a sequence of images with different poses and positions. Alternatively, free viewpoint video for a dynamic (active) scene such as a sport is generally performed using a network of cameras.

For the dynamic case it is common to use a calibrated network of cameras, that is a set of cameras for which key parameters have been estimated. The calibration parameters may consist of extrinsic parameters (e.g., orientation and pose) and intrinsic parameters (e.g., focal lengths, principal point offset and axis skew). Techniques for camera network calibration are well known and commercial solutions are available. The calibration techniques may be divided broadly into marker based and markerless techniques depending on whether custom markers are placed in the scene and imaged during calibration.

The calibration parameters of a camera may drift over time, for example due to mechanical, thermal or optical instability in the system. The network calibration may be maintained however either by repeating the calibration process at intervals, or by stabilising the image content from the cameras. For example, real time correction of calibration parameters and/or image content for a single camera can be achieved using patch based alignment techniques. Patch alignment techniques use patches of regions of the scene captured in image data to align two or more images of the scene. The patches may be determined in advance (predetermined) or determined from image data captured for the current scene. Alignment is performed by the application 133 using patch data from a target frame and a reference frame. For example, to calibrate a network of cameras in real time, alignment patches are determined from the reference frame in advance and locations of the determined alignment patches are then used to align the reference frame and a plurality of target frames. The alignment patches may be selected using non-maximum suppression techniques based on quality of alignment patches, distance between the patches and difference in a reference or dominant direction of features in the patches such that the patches have strong and well distributed dominant directions and are distributed throughout the scene. To perform patch-based alignment in real time, the patch data for reference patches of the reference frame can comprise a reference or dominant direction of a feature in an associated reference patch and a reference signal. The reference signal corresponds to a projection of reference patch image data in a direction substantially perpendicular to the reference direction. In per-forming patch alignment, the application 133 can determine a shift between at least one of the reference patches and a corresponding target patch in the target frame using the reference signal associated with the reference patch and a target signal corresponding to a projection of the target patch image data in the direction substantially perpendicular to the reference direction associated with the reference patch. Alignment data for the target frame can be determined using the determined shift for said reference patch.

The analysis may be performed on custom hardware on the back of a camera to ensure real time performance. The patch based alignment techniques can be used on a set of cameras in a camera network (such as the network 120) to ensure that the required accuracy of calibration is maintained over a suitable timeframe for broadcast of an event.

The resolution of the virtual video images generated is limited by the resolution of the captured video from the camera network. If an event takes place in a large area then the cameras may be optically zoomed to a particular region of interest in order to allow higher resolution free viewpoint video to be generated. For example, in a soccer game the cameras may be zoomed to the penalty area around the goal at one end of the field, in baseball the cameras may be zoomed to one of the bases, or in cricket the cameras may target a region around the wicket. In order to cover multiple areas at high resolution for free viewpoint video it may be necessary to use multiple camera networks, each of which covers a particular region of interest, or to move the regions over time to track the interesting activity of the event. The movement of a region of interest may be continuous, for example tracking a player of interest, or discrete, for example a change in region of interest during a break in play.

A network of cameras may be considered to capture images that give coverage of some volume of space for the purpose of free viewpoint video. The coverage is the volume in space within which objects may be accurately rendered from a desired range of synthetic viewpoints, and should be greater than the volume of interest (VOI) or set of volumes of interest. The coverage given by a set of cameras may be a complex function of the set of desired synthetic viewpoints and the geometry of objects. The reason for the dependency is that all parts of objects in the coverage region that are visible from any virtual camera configuration must be imaged by a sufficient number of cameras to allow the virtual view to be synthesised. Some parts of the objects in the volume of interest may be hard to image due to occlusions, for example due to concavities, even though they would be visible from a virtual camera. The arrangements described synthesize free viewpoint video within an operational volume, as defined below, based on viewpoint parameters.

In practice, however, the dependency of the volume that is covered by a set of cameras on the specific geometry of potential imaged objects may not be considered when designing a set of cameras to handle a given volume of interest. Some more simple heuristics may be used. One suitable heuristic that may be used is to assume that most objects of interest can be handled reasonably well if a sufficient density of camera viewpoints around the volume of interest is used. In this case, the coverage of a set of cameras can be determined based on some simple analysis.

Figure 4A:
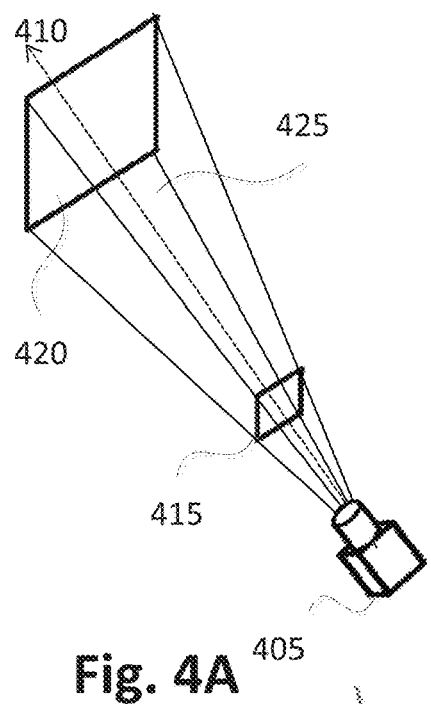
FIGS. 4A-4C illustrate the field of view of a simple camera, a pair of cameras and a group of 6 cameras to illustrate the concepts of volume of interest (VOI), the coverage of a set of cameras for free viewpoint video, and the system volumes.
Figure 4B:
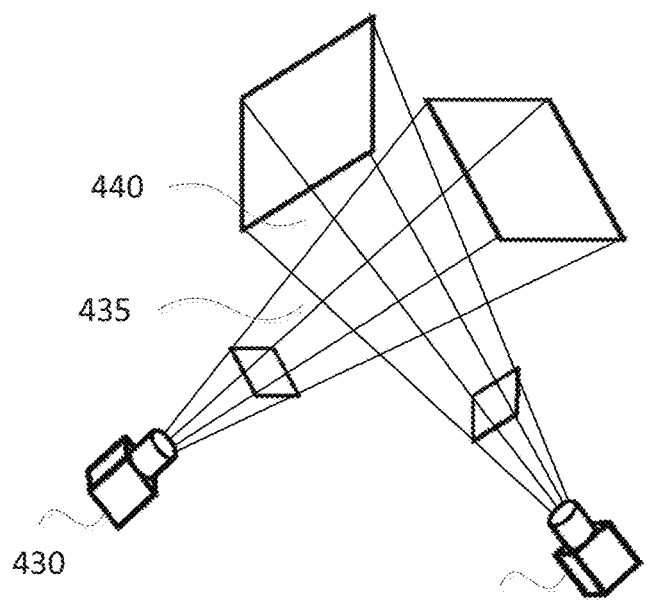

In a simple case a camera behaves according to a pinhole camera model and captures images on a rectangular sensor. The camera captures content contained within a volume of space that may be represented by a pyramid like region where the apex of the pyramid is at the centre of the camera and the pyramid extends from this point along the optical axis of the camera. The volume of space is illustrated in FIG. 4A. FIG. 4A shows a camera 405, an optical axis 410 of the camera 405, and a volume 425 captured by the camera 405. The volume 425 is contained within the field of view of the camera 405. Two illustrative planes captured by the camera 405 are shown, planes 415 and 420. The planes 415 and 420 are perpendicular to the optical axis 410. FIG. 4B shows a volume captured by a pair of cameras, 405 and 430. The captured volume is given by an intersection of a volume 435 captured by the first camera 405 and a volume 440 captured by the second camera 410. The intersection of volume is defined by a polyhedron.

Figure 4C:
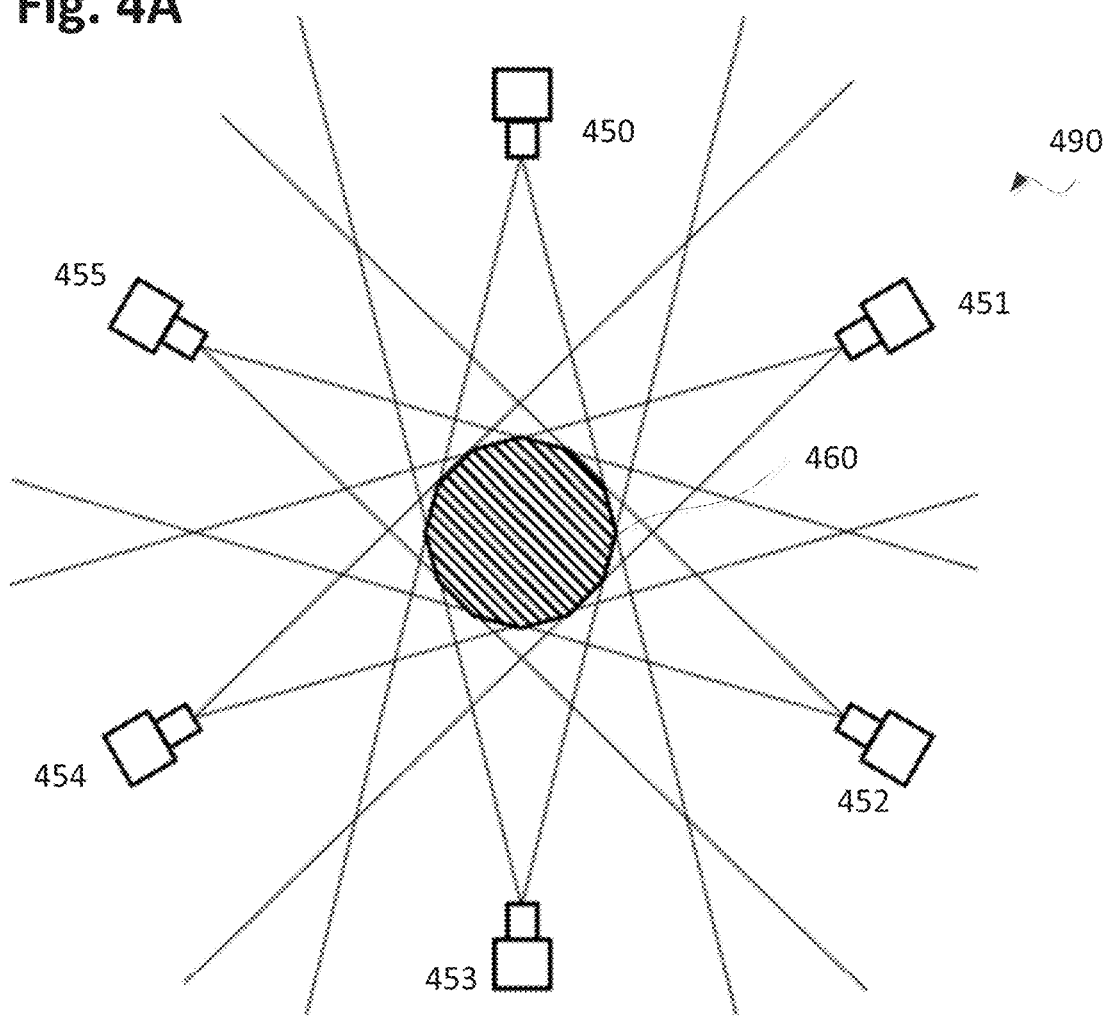

As the number of cameras increases, the number of polygonal sides of the polyhedron formed by the intersection increases. FIG. 4C shows a view 490 from above for a set of 6 cameras (450-455) spaced evenly around a circle pointing in to the centre of the circle. A hashed region 460 shows the intersection of fields of view (solid lines) of the set of cameras 450-455 from above. In 3D space the intersection of the cameras 450-455 would take a complicated form. The volume of interest may be considered to be covered by the set of cameras 450-455 if the polygon region contains the volume of interest. For a set of cameras with low tilt (elevation angle), the volume of interest is limited to a range of heights from the ground and may be approximated by the space directly above a region of interest on the ground plane up to a given maximum height.

In the context of the present disclosure, the maximum coverage of a camera network is referred to as the system volume. The system volume is defined by intersection of fields of view of the cameras, and reflects a portion of a scene that the cameras can capture images of (for example the scene can be the area 100). The system volume is the volume within which free viewpoint video may be generated using the full field of view for a full sensor capture on each camera. The system volume for the network of 6 cameras 450-455 shown in FIG. 4C can be represented by the hashed region 460.

If the one or more sensors of the cameras 450-455 are only partially sampled (read out occurs for only a fraction of the sensor area), then the coverage will be smaller than the system volume. The reduced volume is herein referred to as the operational volume. Given that the sensor read out regions are smaller for the operational volume compared to the read out regions for the system volume, a higher frame rate can be achieved for the operational volume. The higher frame rate is possible when the sensor performance has a trade-off between the frame rate and the frame size as discussed above with reference to FIG. 3. The smaller operational volume corresponds to smaller captured frame size and accordingly a higher frame rate may be achieved, for example a broadcast frame rate required for free viewpoint video. The predetermined frame rate required to generate free viewpoint video is typically relatively high. The frame rate achievable for the system volume is typically below the predetermined or required frame rate.

Figure 5A:
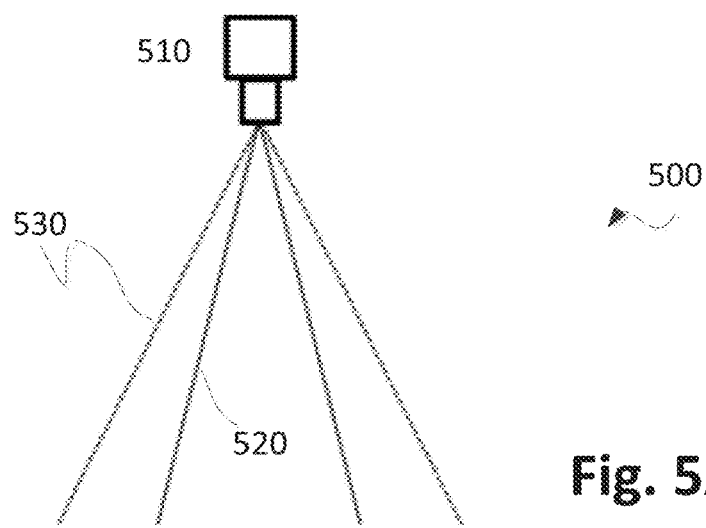
FIGS. 5A and 5B illustrate the full field of view and the sampled field of view of a camera with a sensor for which pixels may be selectively read, and illustrates the concept of the coverage of a set of 6 symmetrically positioned cameras and the operational volume.

FIG. 5A illustrates a top down view 500 of a camera, 510. The sampled field of view 520 for the camera 510 read out on a sensor is given by a region between the solid lines. The sampled field of view 520 is narrower than a full field of view 530 of the sensor shown by the region between the dashed lines. As described above, if the sensor performance has a trade-off between the frame rate and the frame size such as that illustrated in FIG. 3, the smaller operational volume corresponds to smaller captured frame size. Accordingly, a higher frame rate may be achieved. The group of pixels of the sensor corresponding to the operational volume may have a different geometry to the sensor itself. For example the pixels read out corresponding to the operational volume may have a different aspect ratio to the sensor, or a different shape (for example circular, square, freeform) to the sensor (which is typically rectangular).

Figure 5B:
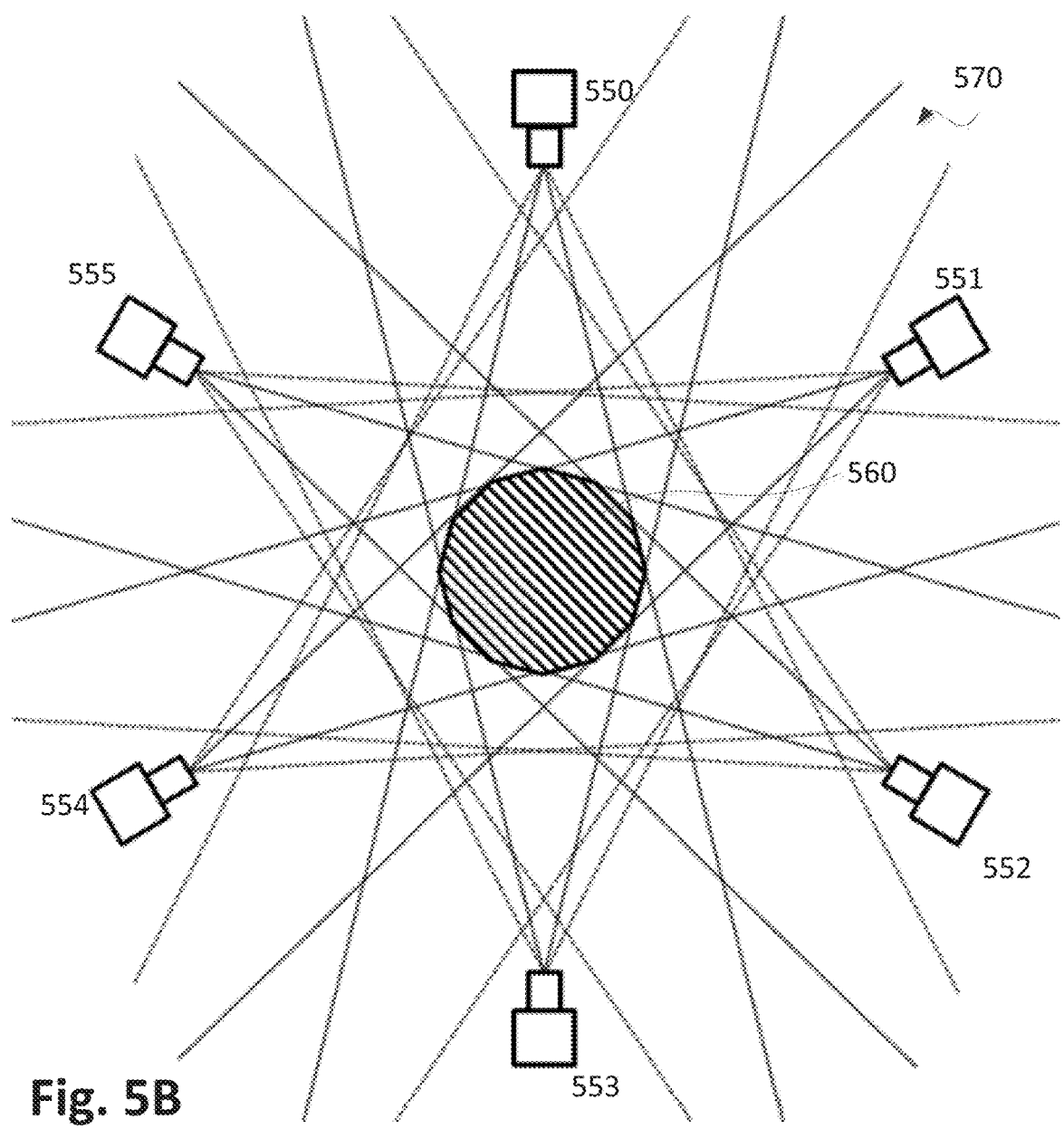

FIG. 5B shows a view 570 from above for a set of 6 cameras (550-555) spaced evenly around a circle pointing in to the centre of the circle. An operational volume 560 is defined by the intersection of the fields of view of the read out sensor regions (shown in solid lines). The operational volume 560 is smaller than the system volume which would be formed by the intersection of full camera fields of view (shown in dashed lines).

In FIG. 5, the volume of interest may vary with time, both in position and in size. For example the volume of interest may correspond to a tracked person or object, or may correspond to some aspect of the expected region with interesting activity for an event, or for other reasons. The tracking may be automatic, manual, or a combination of both. The tracking can be implemented using known image tracking techniques.

Figure 6A:
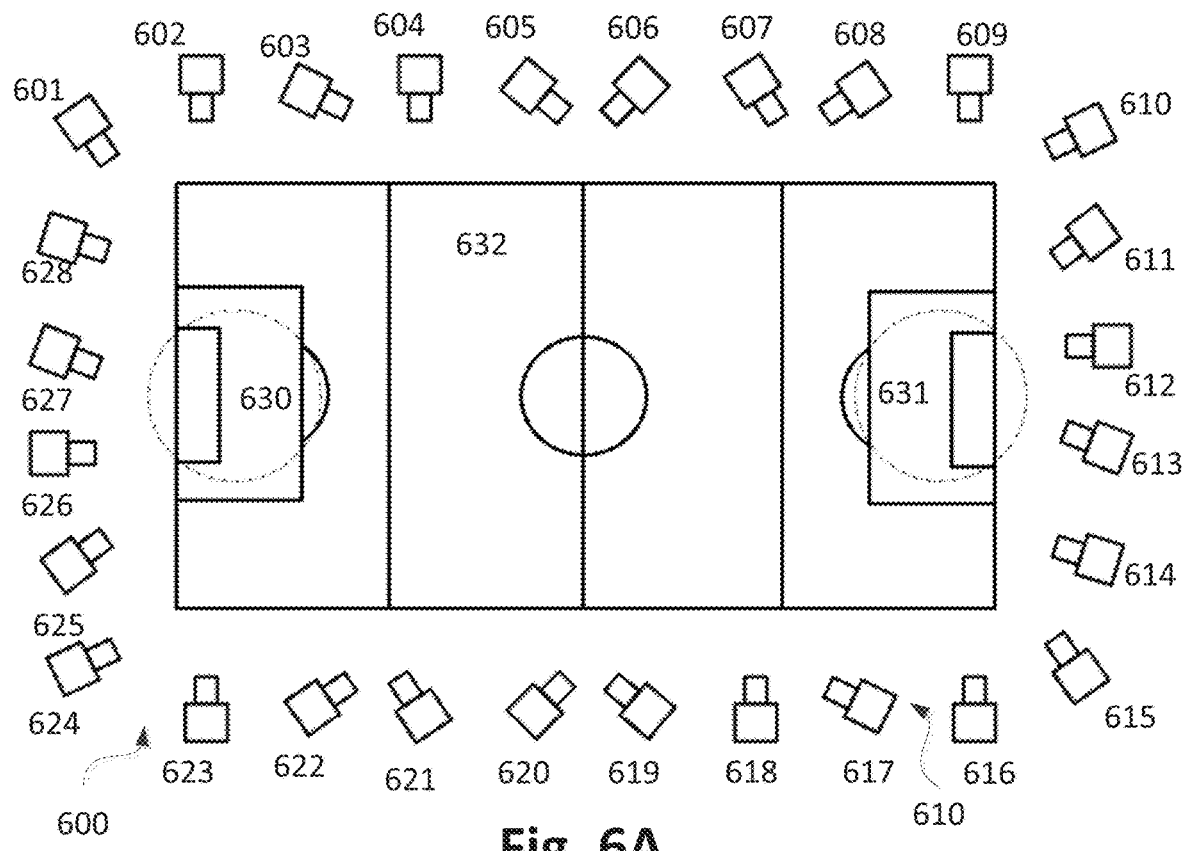
FIGS. 6A and 6B show views from above of a playing field covered by (a) two networks of calibrated cameras with system volumes that give coverage of two separate VOIs, and (b) a single network of calibrated cameras with a single large system volume that includes both VOIs and that includes two smaller operational volumes that cover the VOIs.

Some systems have been designed that use networks of cameras spaced evenly around an event venue. The networks of cameras may include one or more loops of cameras at different heights and may be made up of tens or even hundreds of cameras. The coverage of very large camera networks may consist of more than one single volume of interest, as subsets of the cameras are directed around multiple separate volumes of interest in the venue. An arrangement where subsets of cameras are directed around multiple separate volume of interest is illustrated in FIG. 6A. FIG. 6A shows a view 600 from above of a playing field 632 with two volumes of interest represented by dashed circles 630 and 631. The volumes of interest 630 and 631 are located in the goal areas and might be expected give good coverage of events of interest to a sports broadcaster, for example during a soccer match.

There are a total of 28 cameras around the field 632 (cameras 601-628, forming a network 610) arranged according to the cameras 120A-X of FIG. 1. Of the cameras of the network 610, half (601, 603, 605, 607, 609, 611, 613, 615, 617, 619, 621, 623, 625, and 627) are directed towards the VOI 630. The other half of the cameras (602, 604, 606, 608, 610, 612, 614, 616, 618, 620, 622, 624, 626, and 628) are directed towards the volume of interest 631. The cameras 601 to 628 may have varying zoom, for example the cameras further from the volume of interest they are imaging may have a higher zoom. The system volume of the camera network 610 of FIG. 6A is the combination of the system volumes of the first and second half sets of camera and is made up of two volumes, one volume around each of the volumes of interest 630 and 631.

Figure 7A:
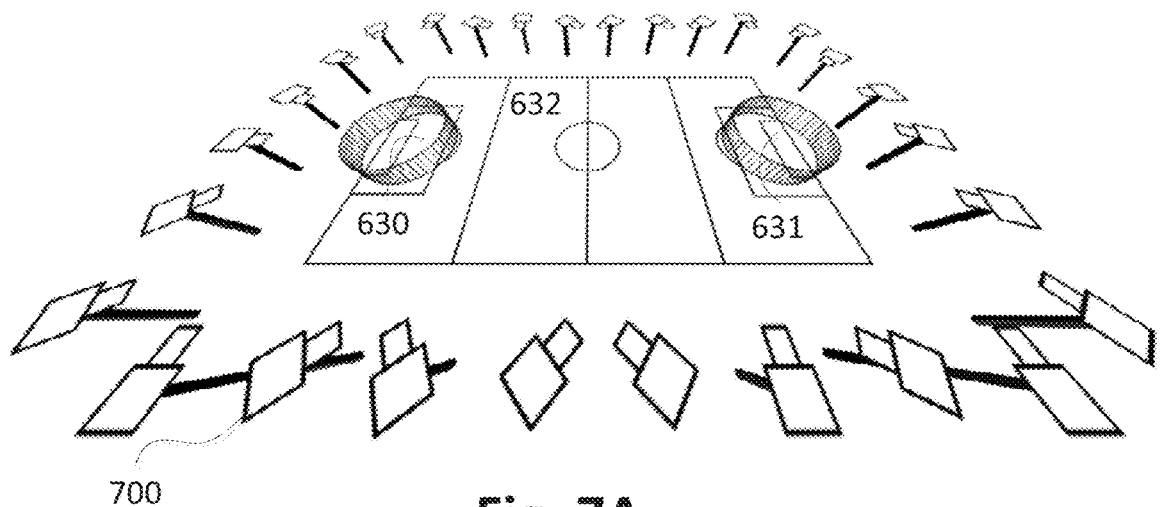
FIGS. 7A-7C illustrate the playing field and camera networks of FIG. 6 from a variety of perspectives around the field.
Figure 7B:
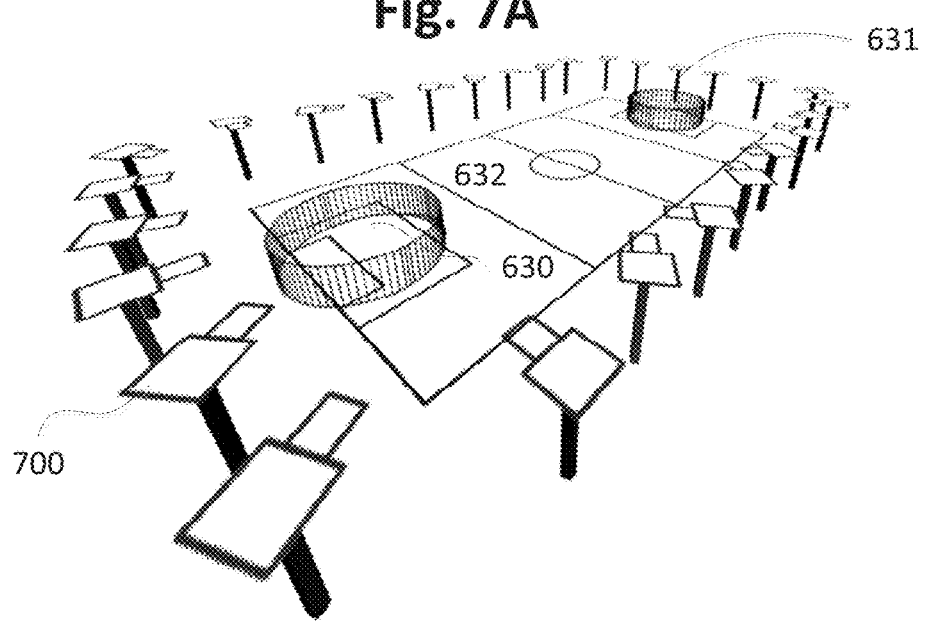
Figure 7C:
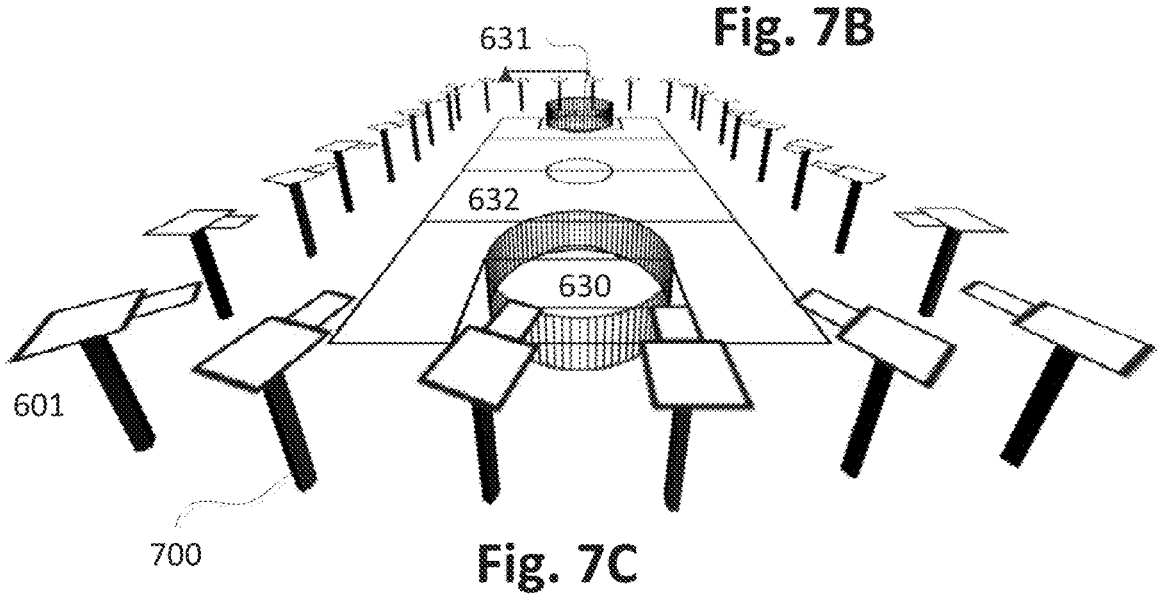

The camera network 610 shown in FIG. 6A is further illustrated in FIGS. 7A, 7B and 7C. FIGS. 7A, 7B and 7C show the same playing field 632, volumes of interest 630 and 631 and network of cameras 700 (representing cameras 601 to 628) from different viewpoints. The 3D nature of the volumes of interest 630 and 631 is represented by a cylinder. The cameras are shown raised above the playing surface and would be tilted to view the volumes of interest correctly. In practice, the positions of the cameras may be constrained by the environment and by design choices related to the requirements of free viewpoint video and methods used to synthesis viewpoints. For example, the cameras may be spread evenly or unevenly around the playing surface and may be at similar or variable heights.

As described above, the volumes of interest may be fixed or moving during the event. If the volumes of interest do move, the camera positions and or poses may need to be changed to accommodate the movements, and the zoom may need to be varied. Such cameras may be referred to as pan, tilt and zoom (PTZ) cameras. However in some embodiments the cameras remain fixed while the image read out from the cameras may be altered. Altering the captured image while the cameras remain fixed may be referred to as digital pan, tilt, and zoom or digital PTZ.

In order to achieve digital PTZ, pan, tilt, and zoom the cameras must be configured to capture a wider field of view with sufficient resolution over all regions that may be selected by the digital pan, tilt, and zoom. Therefore a relatively large sensor is required and the optical capture must have a wider field of view with sufficient resolving power than the standard pan, tilt, and zoom case. For example the field of view associated with a standard pan, tilt, and zoom camera (e.g. cameras 601-628) might around 10 to 20 degrees, while the field of view of a digital pan, tilt, and zoom camera (e.g. cameras 652-678 of FIG. 6B) might be 45 degrees or more. This field of view can achieved using a lower focal length lens for example. In the context of the arrangements described, a "large sensor" relates to a sensor of sufficient size that a read out of all pixels of the sensor cannot be achieved at the broadcast frame rate required for free viewpoint video.

Figure 6B:
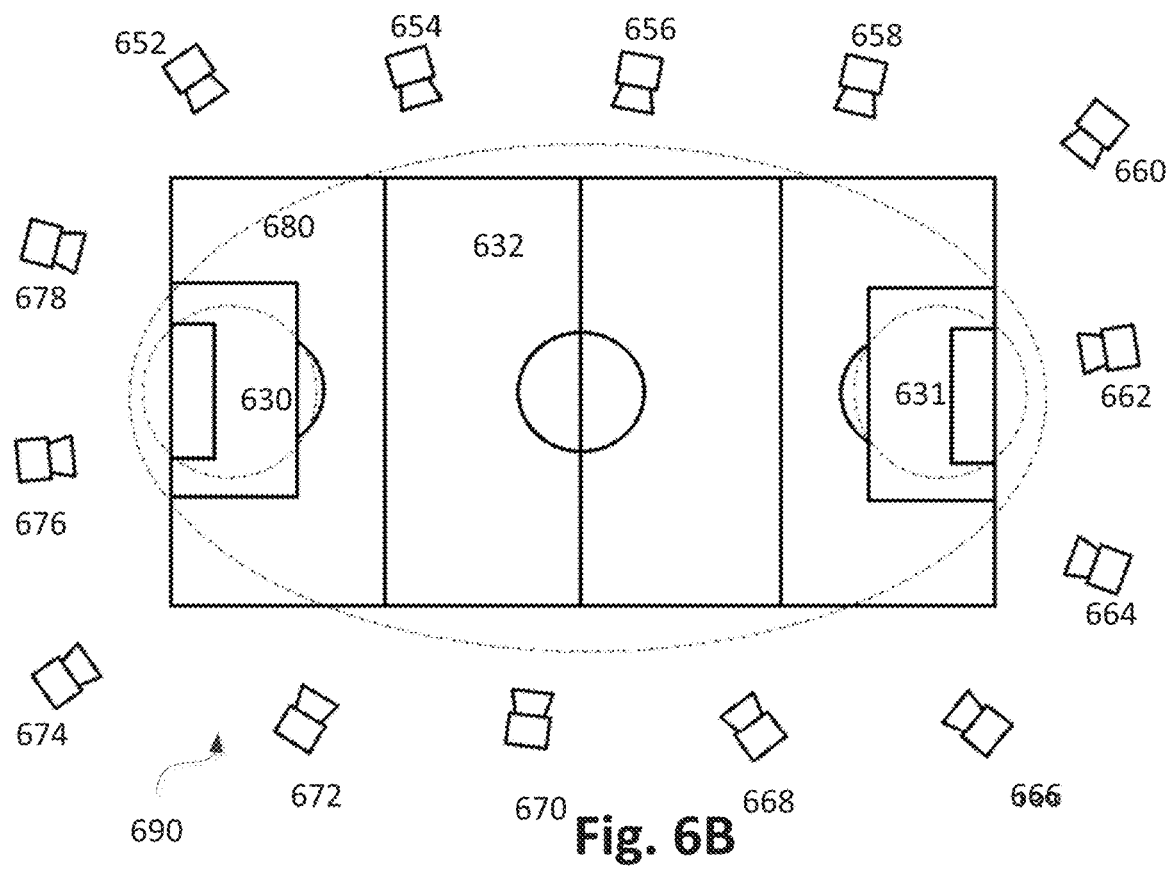

FIG. 6B illustrates a set of 14 wide field cameras (652, 654, 6556, 658, 660, 662, 664, 666, 668, 670, 672, 674, 676 and 678) forming a network 690. The cameras of the network 690 have large sensors that may be used to capture the entire playing area 632. The cameras of the network 690 are in the same positions as cameras 602, 604, 606, 608, 610, 612, 614, 616, 618, 620, 622, 624, 626, and 628 of FIG. 6A but with slightly different poses. The maximum coverage, or system volume, 680, of the configuration of FIG. 6B includes most of the playing field.

If the field of view is some multiple M of the standard pan, tilt, and zoom field of view, then the sensor of the cameras typically requires at least $M^2$ times the number of pixels of the original sensor to capture at an appropriate resolution. For example if the standard pan, tilt, and zoom camera used a high definition (HD) sensor, and the field of view was increased by a factor of 4, an 8K sensor would be required for digital pan, tilt, and zoom, with approximately 16 times as many pixels. As discussed above in relation to FIG. 3, the frame rate of the sensor may be limited by maximum bandwidth. The larger sensor may not be able to read out image data for the full set of pixels at a required broadcast frame rate (the predetermined frame rate required for free viewpoint video).

Digital pan, tilt, and zoom may be used to reduce the coverage to a single volume of interest such as 630 or 631. In order to achieve the reduced coverage, the digital PTZ of each camera in the network 690 would be set to capture the appropriate set of pixels that correspond to the volume of interest. In the case that cameras of the network 690 are set to capture volume of interest 630 then pan, tilt, and zoom PTZ would be used such that the pixels of camera 652 are read out only within a subset of the field of view of 652 (for example the field of view of camera 602 of FIG. 6A), and the pixels of camera 654 are read out only in a subset (such as the region relating to the field of view of the camera 604), etc. Accordingly, with reduced capture regions for each camera, a higher frame rate may be possible and the desired broadcast frame rate (for example the predetermined frame rate) may be achieved.

Figure 8A:
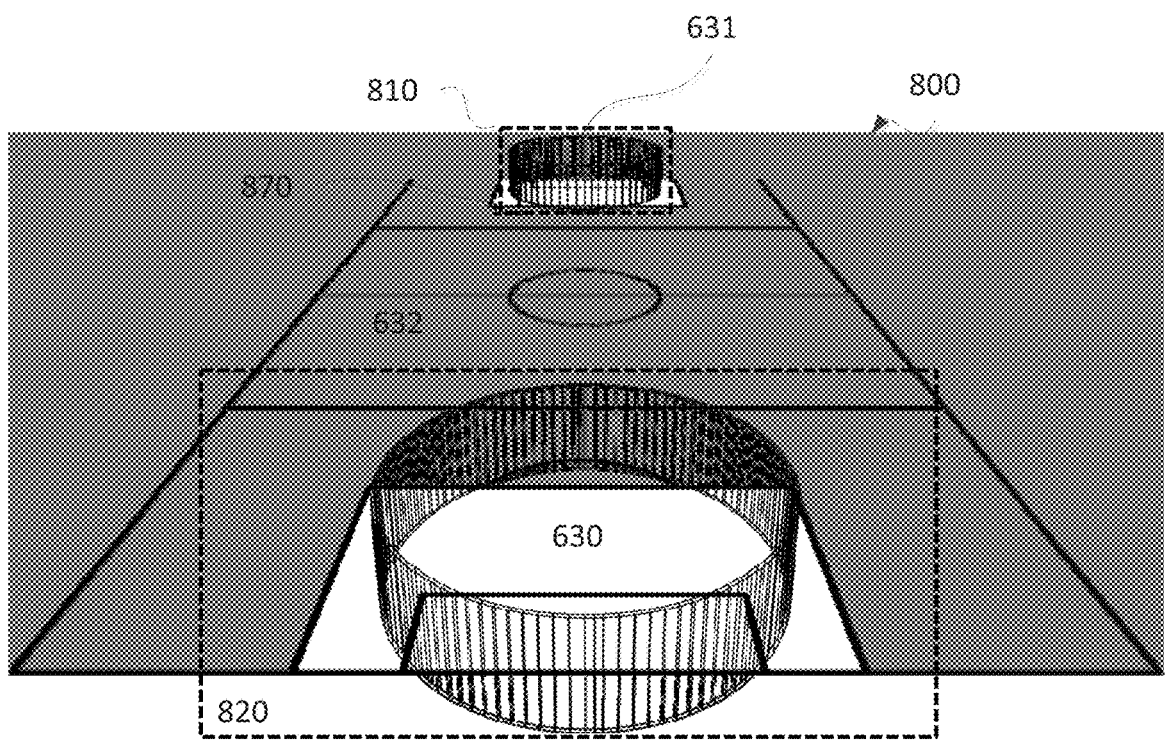
FIG. 8A illustrates the fields of view of two standard cameras imaging a near and far VOI.
Figure 8B:
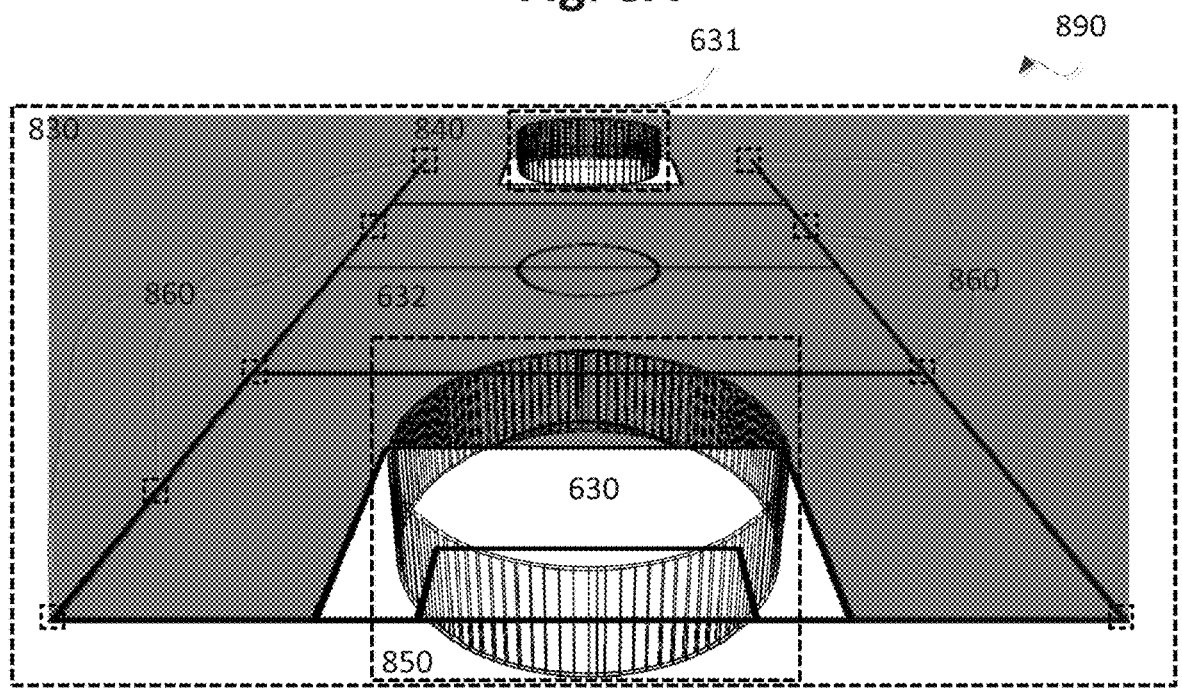
FIG. 8B shows the full field of view of a camera with a sensor for which pixels may be selectively read, and two sampled fields of view that image the near and far volumes of interest and contribute to the definition of the operational volumes, in addition to a number of smaller regions selected for pixel read out that may be used in for alignment.

FIGS. 8A and 8B illustrate use of digital pan, tilt, and zoom to achieve an operational volume for which a higher frame rate may be achieved while maintaining coverage of a volume of interest. FIG. 8A shows a perspective view 800 of the field 632 from the viewpoint of a camera set up behind the goal mouth, for example near the location of cameras 626 or 627 of FIG. 6A. For the near volume of interest 630, the camera pan, tilt, and zoom (real) is set to capture the field of view 820, while for the far volume of interest 631, the camera pan, tilt, and zoom is set to capture a field of view 810, FIG. 8B shows a field of view 830 of an alternative camera, e.g. in a position similar to the camera 676 of FIG. 6A. The camera to which FIG. 8B relates has a wider field of view and a larger sensor than the camera to which FIG. 8A relates. In order to give an operational volume that covers the far volume of interest 631, only pixels in a region 840 need to be read. On the other hand, to give an operational volume that covers the near volume of interest 630, only pixels in a region 850 need to be read. The region 850 is a more efficient sampling for the volume of interest 630 as the region 850 extends horizontally only as far as the volume of interest 630 in the camera capture. On the other hand, using the standard PTZ capture, a wider region 830 was captured including some pixels that are not required by free viewpoint video.

It may be possible to read out pixels from more than one region of a sensor of an image capture device (camera), allowing capturing of image data covering multiple operational volumes using a single camera network. Returning to the example in FIG. 8B, the pixels for example can be read from the sensor covering regions at the top and bottom of the full frame (such as the regions 840 and 850). If all cameras in the camera network of FIG. 8B (for example corresponding to cameras 652 to 678 of FIG. 6B) capture two regions corresponding to the two volumes of interest 630 and 631, then the camera network would cover two operational volumes. Depending on the geometry and the properties of the sensor, capturing the two operational volumes of interest may be possible to achieve at a higher frame rate than reading all of the sensor pixels, and accordingly allow a capture frame rate suitable for broadcast. In this case the total number of cameras required to give coverage of both volumes of interest has been reduced by a factor of two. The reduced number of cameras represents a significant potential cost reduction in terms of hardware and installation.

Similarly, more than two operational volumes might be covered using a single camera network, resulting in an even larger reduction in the number of cameras. Furthermore, modifying the sensor read out regions of each camera over time can be achieved, such that multiple moving volumes of interest may be covered by multiple moving operational volumes while still maintaining a required broadcast frame rate.

The advantage of reducing the number of cameras required to cover a set of operational volumes is made possible through the use of cameras with a wider field of view combined with a large sensor and by reading a subset of the pixels of the sensor. Due to bandwidth considerations, it would not typically be possible to read out all sensor pixels at the required frame rate. However, the sensor is able to read out a reduced set of pixels in customised regions corresponding to the operational volumes at a sufficient resolution for free viewpoint video generation and at the required broadcast frame rate (typically a predetermined frame rate).

Furthermore, if the sensor is capable of reading out more regions than are required at the required frame rate for free viewpoint video it may be advantageous to read out additional regions of the captured scene for the purpose of alignment. If there is bandwidth available to transmit additional pixel information without compromising the required broadcast frame rate, then extra pixel data can be read out and transmitted for frame stabilisation or maintaining calibration. As discussed above, real time correction of calibration parameters and/or image content for the set of single cameras in a network can be achieved using a patch based alignment technique. The accuracy and robustness of patch alignment techniques depends on a number of factors including the distribution of suitable image features over the field of view, occlusions of image patch regions due to activity (e.g. players running over field markings), and various parameters of the algorithm such as patch size and number. Desirable image features may include line, edge or corner like features depending on the exact technique being employed.

Patch based alignment techniques may perform an initialisation step that selects the best patches for alignment. If the patches are selected over a wider field of view then higher quality patches may be found. For example, in the case of a stadium event, the wider field may include additional features such as stadium structures that may be particularly useful for alignment. Also, depending on the model of the distortion due to instability of a camera, there may be advantages to finding patches with relatively wide separations. In particular patches with wide separations are advantageous for modelling transforms such as projective, affine, and RST (rotation, shift, translation) transforms. Furthermore, in the presence of occluding objects such as players on a field, there may be another advantage to well separated patches. The advantage is because patches that are close together are more likely to be occluded at the same time, for example in a ball game there may be many players crowded around the ball and multiple patches may be occluded simultaneously.

FIGS. 8A and 8B illustrate the difference in quality of patches that may be used for alignment between a standard camera capture network and one with digital PTZ capability. In FIG. 8A, the image capture region 810 of volume of interest 631 has relatively poor image content with limited suitable patches for alignment 870. In contrast, with the full field of view 830 of the sensor of the digital pan, tilt, and zoom of FIG. 8B there are many relatively high quality image alignment patches 860 that may be selected. Although the features of the patches 860 are outside the fields of view 850 and 840 captured for either of the volumes of interest 630 and 631, the patches 860 may be read out as additional alignment patch images. The patches 860 would be expected to give improved alignment performance in terms of accuracy and/or robustness. The Unproved alignment performance in turn may improve the quality the camera calibration and in turn of free viewpoint video generated from images captured using the network of cameras. The additional read out patches for alignment may be combined with patches from within the read out regions that cover the volumes of interest (840 and 850) to give a further improved performance.

The set of patches for alignment may be selected using an automated method of patch selection. A wide range of techniques for selection of alignment patches are known. The selection techniques may use image processing to analyse image texture across a full image. The criteria for selection typically depend on the precise alignment model and techniques used. A full image of the scene may be captured for the purpose of selecting image alignment patches prior to free viewpoint video synthesis. The scene captured may, for example, use images captured for the purpose of camera calibration. The full sensor images are typically captured at a reduced frame rate (below the frame rate required for free viewpoint video). However, given that calibration and selection of patches for alignment are pre-processing steps that occur prior to any real time processing, the reduced frame rate does not compromise the system performance. Once the locations of the alignment patches are known, the locations may be tracked over time by sampling only relatively small regions of the capture sensor corresponding to the tracked locations. The sampling of small region can be achieved without compromising the real time performance of the system as the alignment patches are very small and do not represent a significant overhead in the transmission of pixels from the sensor.

Figure 9A:
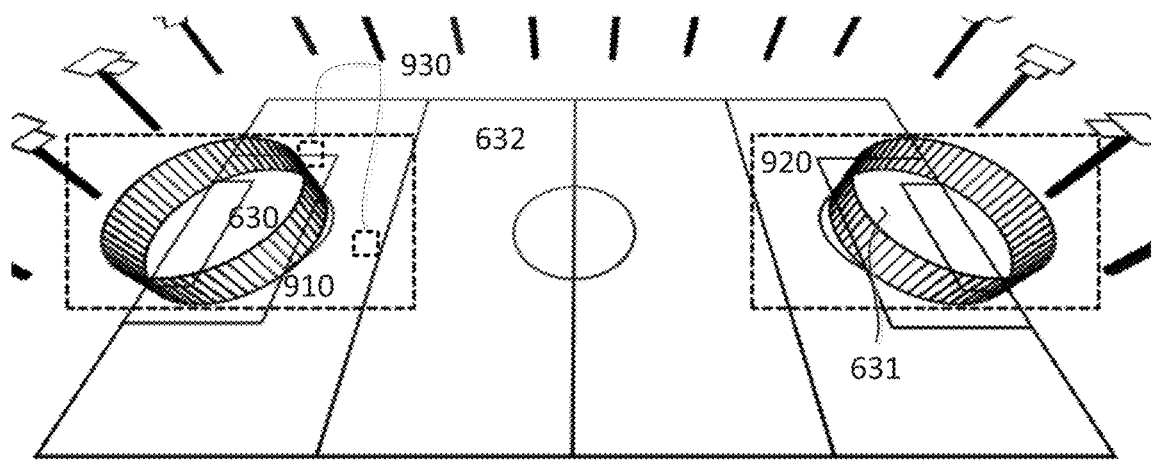
FIG. 9A illustrates a perspective view from cameras of a calibrated camera network including the full fields of view of two standard cameras configured to cover two VOIs.
Figure 9B:
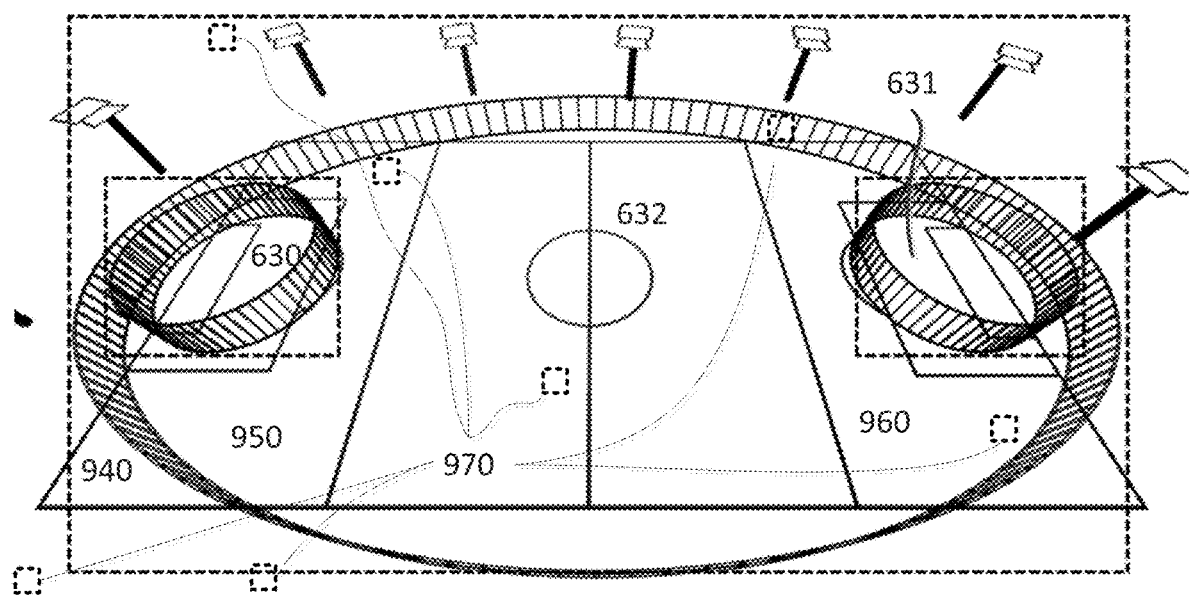
FIG. 9B shows a perspective view from the full field of view of a single camera with a sensor for which pixels may be selectively read and for which variously shaped sampled fields of view are used to capture volumes of interest and alignment features.
Figure 9C:
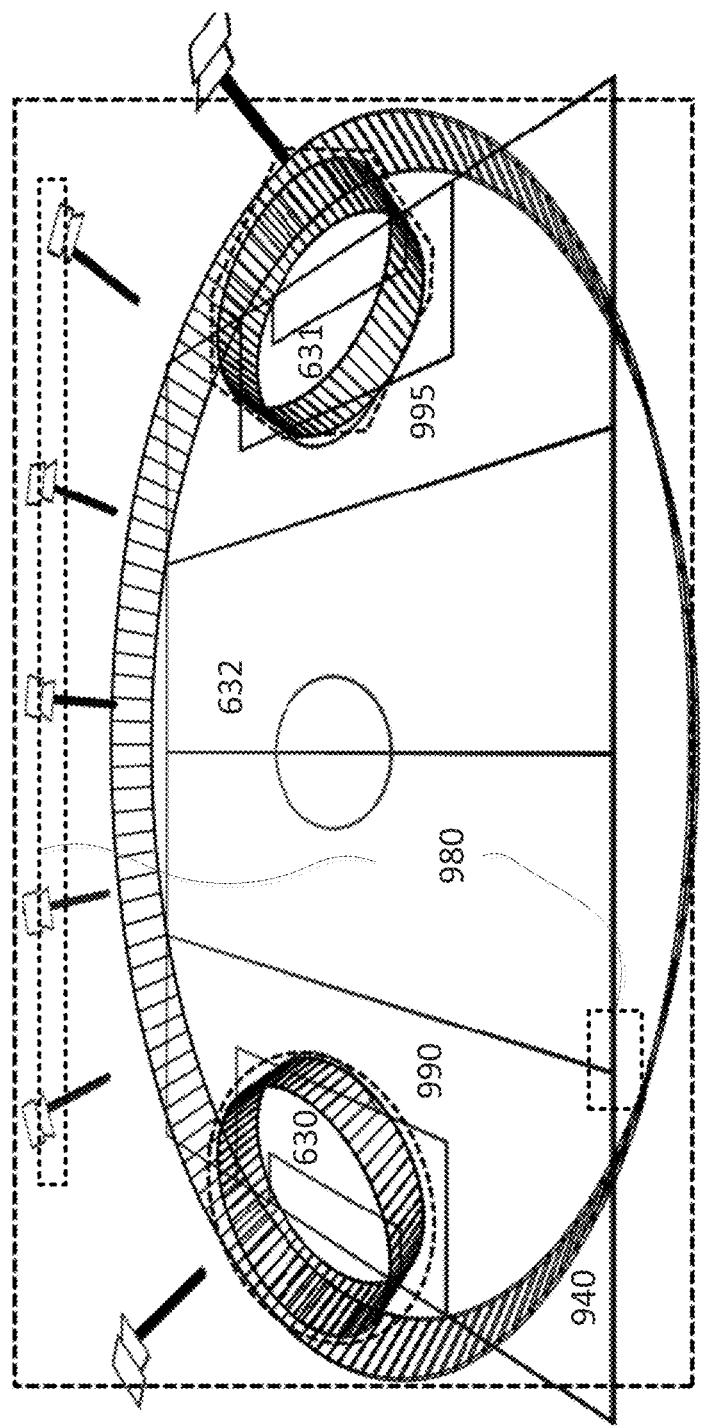
FIG. 9C shows a perspective view from the full field of view of a single camera with a sensor for which pixels may be selectively read and for which variously shaped sampled fields of view are used to capture volumes of interest and alignment features.

The improved quality of alignment patches for the digital pan, tilt, and zoom case is further shown in relation FIGS. 9A to 9C. FIG. 9A shows a perspective view of the field 632 from the viewpoint of a camera set up at the side of the playing field around the location of camera 619 or 620 of FIG. 6A. For the left volume of interest 630, the real (non-digital) camera PTZ is set to capture a field of view 910 and within the field of view 910 a restricted set of image alignment patches 930 may be selected.

FIG. 9B shows a field of view 940 of an alternative camera, e.g. at a position corresponding to the camera 670 of FIG. 6B, with a wider field of view and a larger sensor. The sensor captures regions 950 and 960, to cover the volumes of interest 630 and 631 respectively. The regions 950 and 960 are more efficiently sampled than using the standard pan, tilt and zoom cameras which capture wider regions 910 and 920 of FIG. 9A that include some pixels that are not required by free viewpoint video. Also, a much wider range of alignment patches 970 can be selected in the example of FIG. 9B. The patches 970 include patches all around the playing field hut also outside the playing field on infrastructure. The patches 970 typically give improved alignment performance in terms of accuracy and/or robustness, potentially improving the quality of synthesised free viewpoint video images.

Some limitations of alignment using the techniques described may be understood as follows, if a full sensor capture with a wide field of view is used then an equivalent alignment could be achieved. However, the frame rate would be slow due to the trade-off between frame rate and frame size described in relation to FIG. 3. On the other hand, if standard pan, tilt, and zoom is used to achieve the same field of view then the capture resolution would be too low to achieve a high quality free viewpoint video. Finally, if standard pan, tilt, and zoom is used with a smaller field of view such that free viewpoint video is possible, then the selection of alignment patches is restricted to the field of view and a reduced alignment performance is achieved.

FIG. 9C shows a second illustration of the digital pan, tilt, and zoom camera field of view 940. In FIG. 9C, an even more efficient capture of the volumes of interest 630 and 631 is achieved by read out of non-rectangular regions. The left volume of interest 630 is captured by an elliptical region 990, while the right volume of interest 631 is captured by a polygonal region 995. An arrangement of the type of FIG. 9C could reduce the bandwidth and allow the capture of multiple volumes of interest at a higher frame rate. Additionally, two larger alignment regions 980 have been marked for read out in FIG. 9C. Smaller alignment patches may be generated from within the regions 980. Simplifying the additional regions read out from the sensor may be advantageous depending on the exact range of possible read out functions of the sensor. Many useful alignment patches may be selected in this way to give improved alignment performance. As discussed above the alignment patches may be combined with patches from within the read out regions for the volumes of interest (950, 960, 990 and/or 995 depending on the configuration). As seen from the regions 980, 90 and 95 of FIG. 9C, the geometry of pixels read out from the sensor may be different to the geometry of the sensor.

Many advantages of adapted digital pan, tilt and zoom sensor readout and image capture for free viewpoint video and camera calibration and alignment have been discussed with reference to FIGS. 3 to 9. Methods that use the techniques described are described hereafter with reference to FIGS. 10 and 11.

A method 1000 of reading image data from camera sensors for the generation of free viewpoint video video for the calibrated network of cameras 120A-X using custom digital PTZ sensor readout is now described with reference to FIG. 10. Method 1000 is used when the set of volumes of interest does not change during the event or frame sequence being sampled.

The method 1000 is typically implemented as one or more modules of the application 133, controlled by execution of the processor 105 and stored in the memory 109.

The method 1000 begins at a set up step 1005. In execution of step 1005, a network of cameras (such as the network 690 of cameras 652 to 678 of FIG. 6B) is set up and calibrated. Network configurations and calibration methods are described above. The system volume is the volume of real space within which a camera network gives coverage for free viewpoint video synthesis by sampling using the full sensor capture on each camera. The system volume is defined by the cameras of the camera network. Examples of system volume are shown using the region 460 of FIG. 4C and the region 680 of FIG. 6B. The system volume can be determined in terms of the camera network configuration. In the arrangements described, the broadcast frame rate required to synthesize free viewpoint video is typically a predetermined frame rate. Video data for the system volume is typically received below the broadcast frame rate required for free viewpoint video.

After the camera network has been set up and calibrated, the method 1000 continues under execution of the processor 105 to an initialising step 1010. Execution of the step 1010 defines one or more fixed volumes of interest in the field of view of at least a subset of the network of cameras. A volume of interest, also referred to as a region of interest, may correspond to an area of interest for broadcast or analysis as described above. A volume of interest may be determined based on image data captured by the camera network 120 or selected by an operator of the camera network 120.

The method 1000 continues from step 1010 to a mapping step 1020. At execution of step 1020 each volume of interest is mapped to a region of the sensor in each camera. The mapping is based on the camera model and camera calibration parameters and the geometry of the volume of interest. For example, in addition to the volume of interest geometry, the mapping may be based on a simple pinhole camera model, and a set of intrinsic and extrinsic parameters. The mapping may further be based on a number of parameters related to optical geometrical distortions such as barrel or pincushion distortion.

The method 1000 continues under execution of the processor 105 from step 1020 to an initialising step 1030. Step 1030 executes to initialise the pixel readout data for each camera and in so doing defines the operational volume or volumes for the camera network. The pixel readout data for a camera is the set of pixels to be read from the sensor for each frame. Typically, the set of pixels will cover a larger region on the sensor than the region corresponding to the mapped volume of interest from step 1020. The pixel readout data is initialised such that the region of interest is captured at the predetermined broadcast frame rate required to allow generation of free viewpoint video. The pixel readout is initialised based in part on the mapping determined at step 1020 (the region of interest) and based on the frame rates achievable for the full sensor and subsets of pixels of the sensor. For example, the set of pixels may be a rectangular region that extends around the volume of interest as illustrated in the regions 840 and 850 of FIG. 8B, a polygonal region such as the region 995 of FIG. 9C, a more closely matching region such as the elliptical region of 990 of FIG. 9C, or some other shape that largely includes the volume of interest. The geometry of the readout region can be different to that of the full sensor, for example have a different aspect ratio or overall shape than the full sensor. The operational volume or set of operational volumes of the camera network is the subset of the system volume of the camera network considered to be sufficiently well covered by the set of sensor readout regions to allow free viewpoint video reconstruction from the desired range of synthetic capture parameters (i.e. viewpoints, zooms, etc). The concept of operational volume is described above using the region 560 of FIG. 5B and the regions 630 and 631 of FIG. 6B. Accordingly, the operational volume is a portion of the system volume and is selected based on the sensor output frame rate, the predetermined frame rate and a region of interest in the scene being captured by the network of cameras. A frame rate for synthesising a viewpoint outside the operational volume is limited by the sensor output frame rate for the system volume outside the operational volume.

The method 1000 continues to a sampling step 1040. In execution of step 1040 step 1040, frames from each camera are sampled by the camera network. In some implementations it is assumed that the cameras are synchronised in time such that each frame is sampled by each camera at or near the same time. Sampling from each camera at the same time may be achieved using genlock or some other synchronisation technique. The method 1000 continues under control of the processor 105 to a reading step 1050. At step 1050, the set of sensor pixels selected for each camera at step 1030 are read. The reading uses the capability of the sensor to read only selected pixel sets in order to achieve a higher frame rate without exceeding the bandwidth capability of the sensor.

The method 1000 proceeds from step 1050 to a free viewpoint video step 1060. In execution of step 1060, if real time free viewpoint video is being generated, then the image data read from each camera is directly sent to a free viewpoint video synthesis processing module, for example a module of the application 133. The free viewpoint video is generated or synthesized at using the image data captured at the required predetermined frequency. Otherwise, if real time free viewpoint video is not being generated, the image data is stored for later use, for offline processing to synthesise free viewpoint video at a later time. The image data may be stored on a camera, or in an external device such as the server 197.

The method 1000 proceeds to a check step 1070. Step 1070 operates to check if more frames are available to sample. If there are more frames to sample ("Yes" at step 1070) then the method 1000 returns from step 1070 to step 1040. Otherwise, if there are no more frames to sample ("No" at step 1070), the method 1000 ends.

An alternative method 1100 of reading image data from camera sensors for the generation of free viewpoint video for a calibrated network of cameras 120A-X using custom digital pan, tilt and zoom sensor readout is now described with reference to FIG. 11.

The method 1100 is typically implemented as one or more modules of the application 133, controlled by execution of the processor 105 and stored in the memory 109.

The method 1100 can be used when the set of volumes of interest changes during the event or frame sequence being sampled, and/or when the sensor read out for one or more camera includes custom patches for camera alignment to maintain the calibration accuracy.

The volumes of interest may move to track expected activity of interest for broadcast, key players actors or performers, some item of equipment (e.g. a ball). The tracking may be automatic or may be controlled by an operator. Many methods of automated tracking are known in the art including methods based on image processing methods, GPS tracking of sports players with wearable sensor technology, etc. The volume of interest consists of a region of 3D points in space, and the mapping from volume of interest to read out regions on each sensor may be determined based on the known camera calibration data. As described below, the sensor read out region on one or more sensors may change over time in order to track the volume of interest. The volume of interest can be tracked using data stored on a camera of the camera network (such as the networks 120 or 610) or on an external device in communication with the cameras such as the server computer 197.

Figure 12A:
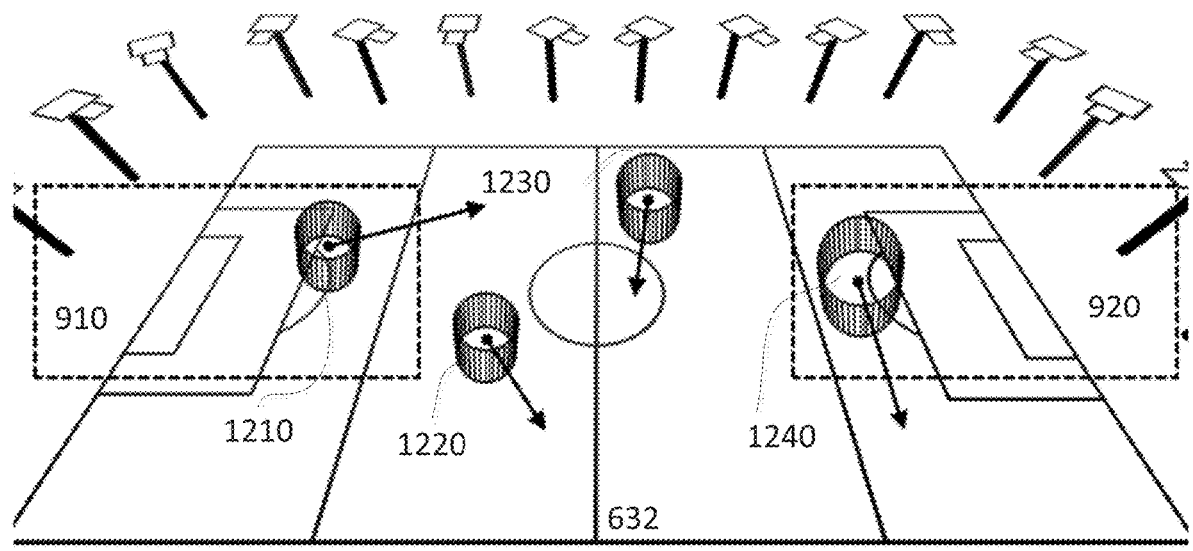
FIGS. 12A and 12B show perspective views of a field, each from a viewpoint of a particular camera arrangement.

FIG. 12 illustrates a case of multiple moving volumes of interest on the playing field 632. FIG. 12A shows a perspective view 1200 of the field 632 from the viewpoint of a camera set up at the side of the playing field around the location of camera 619 or 620. There are four volumes of interest illustrated on the field (volumes 1210, 1220, 1230 and 1240). Each of the volumes of interest 1210, 1220, 1230 and 1240 is associated with an arrow indicating the speed and direction of motion of the volume of interest. The volumes of interest may correspond to players moving around the field, sports equipment or other people or objects. The camera may be set up to capture a region such as regions 910 or 920. The camera capture region may be modified using standard pan, tilt and zoom. In general, however, it is not possible to capture all four regions at sufficiently high resolution and frame rate using standard pan, tilt and zoom.

Figure 12B:
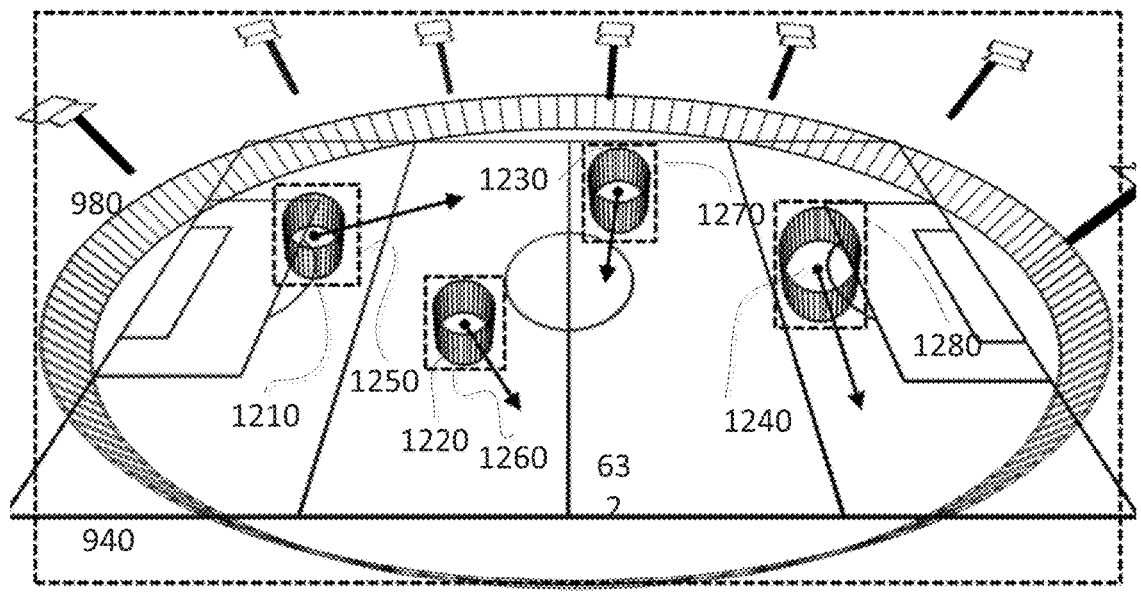

FIG. 12B shows a wider field of view 940 of an alternative camera, e.g. 670, with a larger sensor using digital pan, tilt, and zoom. The system volume of the sensor network 940 is large enough to include all of the four volumes of interest in the example of FIG. 12B. The sensor of the camera may be configured such that a set of regions 1250 to 1280 associated with the four volumes of interest 1210 to 1240 can be captured at the required broadcast frame rate for free viewpoint video generation. The total read out per frame is the combination of the four regions 1250 to 1280, and the maximum possible frame rate may be determined based on this geometry and the properties of the sensor.

In the arrangement of FIG. 12B, sampling and reading out more pixels per frame while still maintaining the desired frame rate is possible. Reading more pixels while maintaining frame rate can allow capturing additional pixels from outside of the volumes of interest that may be used to generate free viewpoint video or for other purposes. For example if the system 100 uses a background model that updates at a lower frame rate, the background model may be updated based on a sampling of additional pixels outside of the volumes of interest with each frame. For example each frame may sample an additional block of pixels, and over time different blocks may be sampled such that the entire background is covered at a lower frame rate. For example it may be possible to update a background model at 1 frame per second while the volume of interest pixel data is updated at a much higher frame rate such as 60 frames per second. The lower frame rate sampling of background pixels may also be used for fixed volumes of interest described above. Accordingly, pixels associated with foreground may be read out a higher frame rate than the background pixels.

In some arrangements background pixels of the operational volume are determined at step 1030 using a background model. The determined background pixels are read out at step 1050 at a frame rate below the predetermined frame rate required for free viewpoint video. The foreground pixels are read out at the predetermined broadcast frame rate.

In some arrangements, a "buffer zone" of pixels may be read out with the pixels associated with the operational volume. Reading a buffer zone of pixels relates to reading out pixels forming a border a predetermined width around the operational volume. The buffer zone is typically read out at a frame rate below the predetermined frame rate required for generating free viewpoint video. Reading the pixels of the buffer zone can be of assistance when the region or volume of interest is being tracked as the buffer zone pixels can be used in determining background pixels as the region of interest moves.

The method 1100 begins at a set up step 1105. During execution of step 1105 a network of cameras (such as 652 to 678 of FIG. 6B) is set up and calibrated and a system volume is defined. Step 1105 operates in a similar manner to that described with reference to step 1005 of the method 1000 illustrated by FIG. 10. The method 1100 continues to an initialising step 1110. Execution of step 1110 initialises one or more fixed volumes of interest in the field of view of at least a subset of the network of cameras. Step 1110 operates in a similar manner to step 1010 of the method 1000.

The method 1100 continues to mapping step 1120. At execution of step 1120 each volume of interest is mapped to a region of the sensor in each camera. As discussed with reference to step 1020 of process 1000, the mapping is based on the camera model and camera calibration parameters and the geometry of the volume of interest. In the case that the volume of interest corresponds to a tracked player or object, the volume of interest may be defined as a simple region that would be expected to enclose the player or object. For example a cylindrical or other simple geometric region may be placed around the known position of a player or object with a size that would be expected to comfortably contain the player or object.

The method 1100 continues to a selection step 1125. Step 1125 operates to select a set of alignment regions based on the images from the camera network. The images used at step 1125 may have been used previously in the calibration step 1105 or may be newer images. As described above, alignment patches may be selected based on image texture and may include 1D or 2D textures such as corners, edges or lines. Preferably, alignment patches are distributed over the sensor of an image capture device and may consist of patches such as the patches in 860 of FIG. 8B and 970 of FIG. 9B, or larger patches such as the patch 980 of FIG. 9C. In some arrangements, the step 1125 may excluded from the method 1100.

The method 1100 proceeds to a sampling step 1130. At 1130, frames are sampled by the camera network. It is assumed that the cameras are synchronised in time such that each frame is sampled by each camera at or near the same time, for example using genlock. Step 1130 operates in a similar manner to step 1040 of FIG. 10.

The method 1100 proceeds to a setting step 1140. Step 1140 sets the pixel readout data for each camera and in so doing defines the operational volume or volumes for the camera network. As described with reference to step 1030 of the method 1000, the pixel readout data for a camera is the set of pixels to be read from the sensor for each frame. The pixel readout data for the set of cameras defines the operational volume or volumes of the camera network. If the volume of interest is being tracked, the volume of interest may have move relative to position on a previous frame. Step 1140 operates to determine that the volume of interest has moved relative to the previous frame and update the operational volume and accordingly the pixel readout regions of the sensor.

The method 1100 continues to an updating step 1145. At step 1145, an operation is performed to modify the current set of sensor pixel readout data according to alignment information from previous frames. The step 1145 may use a forward prediction model based on previous alignment results. The alignment information for a given camera may take the form of a transform such as a projective, affine, or other linear or nonlinear transform over the sensor. This transform may be used to distort the sensor pixel readout geometry to compensate for camera misalignment. Accordingly, a new set of sensor pixel readout data for the camera network can be generated. In some implementations, step 1145 may be omitted.

The method 1100 continues to a reading step 1150. At step 1150, the set of sensor pixels selected for each camera at step 1140, and updated at step 1145, are read. The reading uses the capability of the sensor to read only selected pixel sets in order to achieve the required frame rate without exceeding the bandwidth capability of the sensor.

The method 1100 continues to an aligning step 1155. Step 1155 optionally executes an alignment check and performs alignment calibration on the cameras of the camera network using known patch-based alignment techniques.

The method 1100 continues to a free viewpoint video step 1165. Step 1165 operates in a similar manner to step 1060 of FIG. 10. In execution of step 1165, if real time free viewpoint video is being generated, then the image data read from each camera is directly sent to the free viewpoint video synthesis processing module. Otherwise the image data is stored for later, offline processing to synthesise free viewpoint video. If there are more frames to sample then processing returns from step 1170 to step 1140, otherwise the method 1100 ends.

INDUSTRIAL APPLICABILITY

The arrangements described are applicable to the computer and data processing industries and particularly for image processing for free viewpoint video.

In selecting subsets of pixels (operation volume) of a field of view of a camera sensor, the arrangements described allow higher frame rates to be achieved in relation to volumes or regions of interest. Accordingly, image data suitable for free viewpoint video may be acquired. Additionally, hardware and software requirements required to generate free viewpoint video may be reduced.

The foregoing describes only some embodiments of the present invention, and modifications and/or changes can be made thereto without departing from the scope and spirit of the invention, the embodiments being illustrative and not restrictive.

The invention claimed is:

1. A method for generating a virtual viewpoint image, the method comprising:
    determining, based on changing of position of a moving object in an image target region which an image capture device captures, a region included in an image which is obtained by the image capture device and which corresponds to the image target region, wherein the image capture device captures the image target region without changing a position and a pose of the image capture device and has a sensor, and information of all pixels of the sensor cannot be obtained at a frame rate of generating the virtual viewpoint image;
    obtaining an image corresponding to the determined region from the image capture device at a frame rate determined based on the frame rate of generating the virtual viewpoint image without obtaining an image which does not correspond to the determined region and which is a part of the image that is obtained by the image capture device and that corresponds to the image target region, wherein the frame rate of obtaining the image corresponding to the determined region from the image capture device is higher than the frame rate of obtaining the image corresponding to the image target region from the image capture device and wherein the frame rate of obtaining the image corresponding to the image target region from the image capture device is lower than the frame rate of generating the virtual viewpoint image; and
    generating the virtual viewpoint based on the image obtained at the frame rate determined based on the frame rate of generating the virtual viewpoint image.

2. The method according to claim 1, wherein the image corresponding to the determined region corresponds to a group of pixels having a geometry different to the geometry of a sensor of the image capture device.

3. The method according to claim 1, wherein the determining includes determining the region based on image data obtained by a plurality of image capture devices.

4. The method according to claim 1, wherein a region is determined by designation of an operator.

5. The method according to claim 1, wherein the determining includes determining the region based on image data obtained by a plurality of image capture devices and mapping pixels of the sensor of the image capture device to the determined region.

6. The method according to claim 1, further comprising reading alignment data from the sensor of the image capture device, wherein the alignment data relates to a region in the image target region outside the determined region.

7. The method according to claim 1, further comprising:
determining an alignment region from image data captured for the image target region by the image capture device; and
performing patch-based alignment using alignment data and calibrating the image capture device based on the patch-based alignment.

8. The method according to claim 1, further comprising:
obtaining alignment data from the sensor of the image capture device, wherein the alignment data relates to a region in the image target region outside the region determined in advance of obtaining the alignment data;
performing patch-based alignment using the alignment data; and
calibrating the image capture device based on the patch-based alignment.

9. The method according to claim 6, further comprising:
performing patch-based alignment using the alignment data; and
updating pixels read out from the sensor based on the patch-based alignment.

10. The method according to claim 1, further comprising:
determining background pixels of the determined region of interest using a background model; and
obtaining the determined background pixels at a frame rate below the frame rate of generating the virtual viewpoint image.

11. The method according to claim 1, wherein the frame rate determined based on the frame rate of generating the virtual viewpoint image is the frame rate of generating the virtual viewpoint image.

12. A non-transitory computer-readable medium storing instructions that, when executed, cause a computer to execute method for generating a virtual viewpoint image, the method comprising:
determining, based on changing of position of a moving object in an image target region which an image capture device captures, a region included in an image which is obtained by the image device devices and which corresponds to the image target region, wherein the image capture device captures the image target region without changing a position and a pose of the image capture device and has a sensor, and information of all pixels of the sensor cannot be obtained at a frame rate of generating the virtual viewpoint image;
obtaining an image corresponding to the determined region from the image capture device at a frame rate determined based on the frame rate of generating the virtual viewpoint image without obtaining an image which does not correspond to the determined region and which is a part of the image that is obtained by the image capture device and that corresponds to the image target region, wherein the frame rate of obtaining the image corresponding to the determined region from the image capture device is higher than the frame rate of obtaining the image corresponding to the image target region from the image capture device and wherein the frame rate of obtaining the image corresponding to the image target region from the image capture device, is lower than the frame rate of generating the virtual viewpoint image; and
generating the virtual viewpoint based on the image obtained at the frame rate determined based on the frame rate of generating the virtual viewpoint image.

13. An apparatus comprising:
one or more processors; and
one or more memories storing instructions that, when executed by the one or more processors, cause the apparatus to perform operations including:
determining, based on changing of position of a moving object in an image target region which an image capture device captures, a region included in an image which is obtained by the image capture device and which corresponds to the image target region, wherein the image capture device captures the image target region without changing a position and a pose of the image capture device and has a sensor, and information of all pixels of the sensor cannot be obtained at a frame rate of generating the virtual viewpoint image,
obtaining an image corresponding to the determined region from the image capture device at a frame rate determined based on the frame rate of generating the virtual viewpoint image without obtaining an image which does not correspond to the determined region and which is a part of the image that is obtained by the image capture device and that corresponds to the image target region, wherein the frame rate of obtaining the image corresponding to the determined region from the image capture device is higher than the frame rate of obtaining the image corresponding to the image target region from the image capture device and wherein the frame rate of obtaining the image corresponding to the image target region from the image capture device, is lower than the frame rate of generating the virtual viewpoint image; and
generating the virtual viewpoint based on the image obtained at the frame rate determined based on the frame rate of generating the virtual viewpoint image.

* * * * *